(12) United States Patent
Kim et al.

(10) Patent No.: US 12,260,656 B2
(45) Date of Patent: *Mar. 25, 2025

(54) METHOD AND APPARATUS FOR ESTIMATING SIZE OF DAMAGE IN THE DISASTER AFFECTED AREAS

(71) Applicant: NATIONAL DISASTER MANAGEMENT RESEARCH INSTITUTE, Ulsan (KR)

(72) Inventors: Seong Sam Kim, Ulsan (KR); Dong Yoon Shin, Ulsan (KR); Cheol Kyu Lee, Ulsan (KR)

(73) Assignee: NATIONAL DISASTER MANAGEMENT RESEARCH INSTITUTE, Ulsan (KR)

( * ) Notice: Subject to any disclaimer, the term of this patent is extended or adjusted under 35 U.S.C. 154(b) by 464 days.

This patent is subject to a terminal disclaimer.

(21) Appl. No.: 17/736,332

(22) Filed: May 4, 2022

(65) Prior Publication Data

US 2022/0358774 A1    Nov. 10, 2022

(30) Foreign Application Priority Data

May 4, 2021    (KR) ......................... 10-2021-0057837

(51) Int. Cl.
*G06V 20/70*    (2022.01)
*G06T 7/00*    (2017.01)
(Continued)

(52) U.S. Cl.
CPC ............ *G06V 20/70* (2022.01); *G06T 7/0002* (2013.01); *G06T 7/60* (2013.01); *G06V 10/764* (2022.01);
(Continued)

(58) Field of Classification Search
CPC .. G06V 10/764; G06V 10/7784; G06V 10/74; G06V 20/35; G06V 10/225; G06V 10/759; G06V 20/10–194; G06V 10/443; G06T 2207/10032; G06T 2207/30181–30192; G06T 17/05;
(Continued)

(56) References Cited

U.S. PATENT DOCUMENTS 10,497,250 B1 * 12/2019 Hayward ................ G06N 3/088
11,004,001 B1 *  5/2021 Frank ....................... G06N 5/04
(Continued)

FOREIGN PATENT DOCUMENTS

KR            102203135 B1    1/2021
WO    WO-2020111934 A1 *    6/2020

*Primary Examiner* — Sean M Conner
*Assistant Examiner* — Stefano Anthony Dardano
(74) *Attorney, Agent, or Firm* — ZION IP; Byungwoong Park

(57) ABSTRACT

According to an embodiment of the present disclosure, there may be provided an operation method of a server for estimating the size of damage in disaster affected areas. In this instance, the operation method of the server may include acquiring at least one first disaster image, deriving an affected area from each of the at least one first disaster image, acquiring affected area related information through labeling based on the derived affected area, and training a first learning model using the at least one first disaster image and the affected area related information.

16 Claims, 20 Drawing Sheets

(51) Int. Cl.
*G06T 7/60* (2017.01)
*G06V 10/764* (2022.01)
*G06V 10/778* (2022.01)
*G06V 20/10* (2022.01)

(52) U.S. Cl.
CPC .......... *G06V 10/7784* (2022.01); *G06V 20/10* (2022.01); *G06T 2207/10032* (2013.01); *G06T 2207/20081* (2013.01); *G06T 2207/30181* (2013.01)

(58) Field of Classification Search
CPC .................. G06T 7/0002; G06T 7/60; G06T 2207/20081; G06Q 50/26; G06Q 50/10; G06Q 10/04; G06Q 10/0635
See application file for complete search history.

(56) References Cited

U.S. PATENT DOCUMENTS

| | | | |
|---|---|---|---|
| 11,392,897 B1* | 7/2022 | Gingrich | G06F 30/13 |
| 2023/0419410 A1* | 12/2023 | Samarasekera | G06Q 40/08 |

* cited by examiner

【Figure 1】
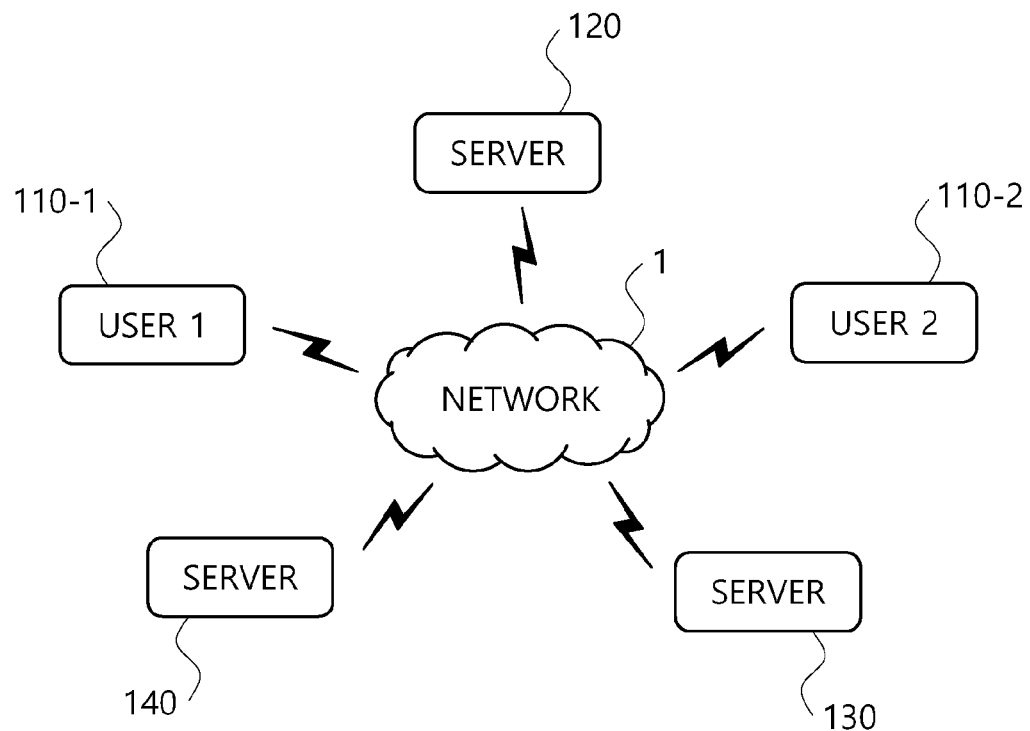
【Figure 2】
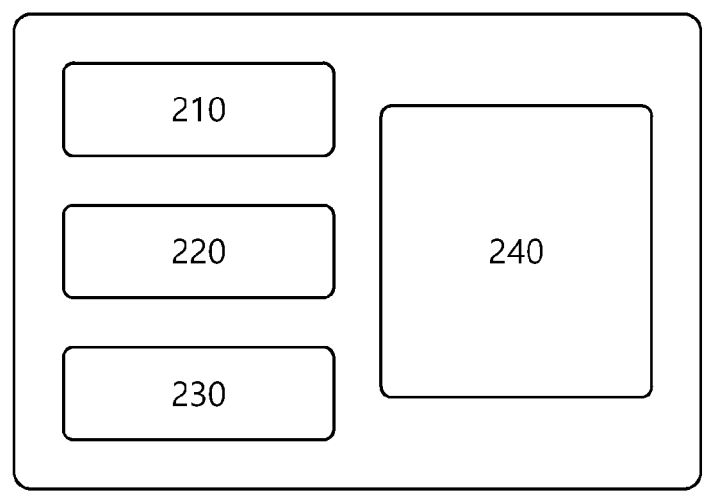

【Figure 3a】
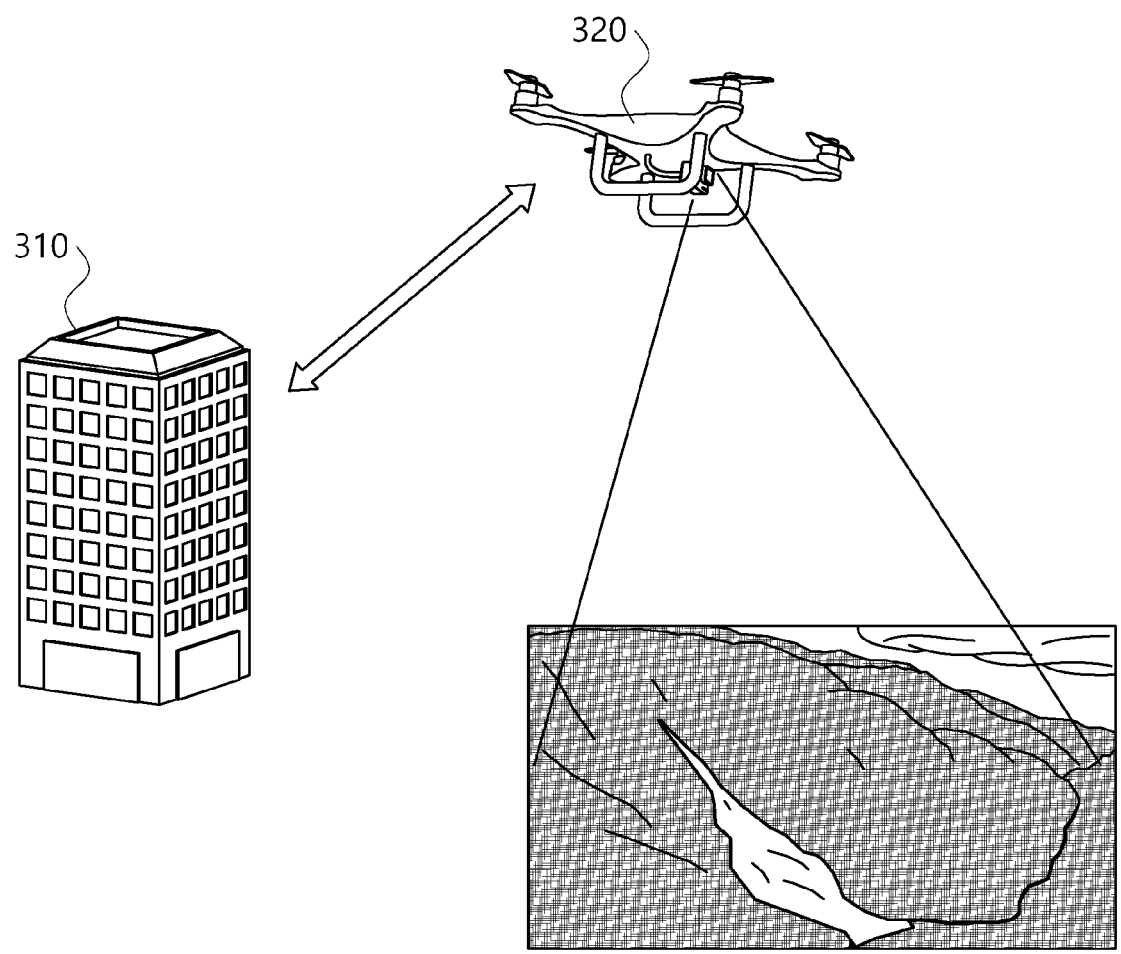

【Figure 3b】
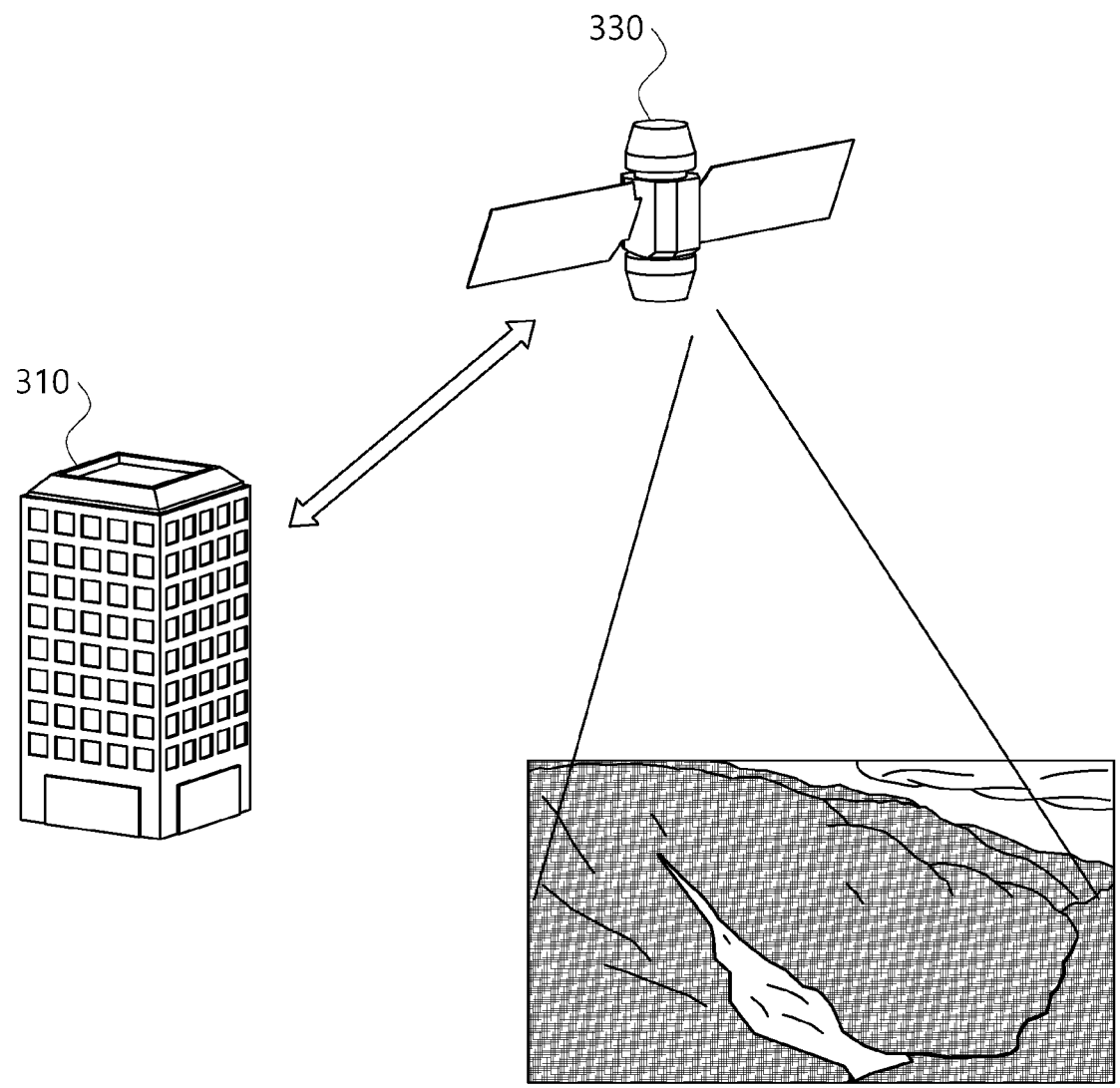

【Figure 3c】
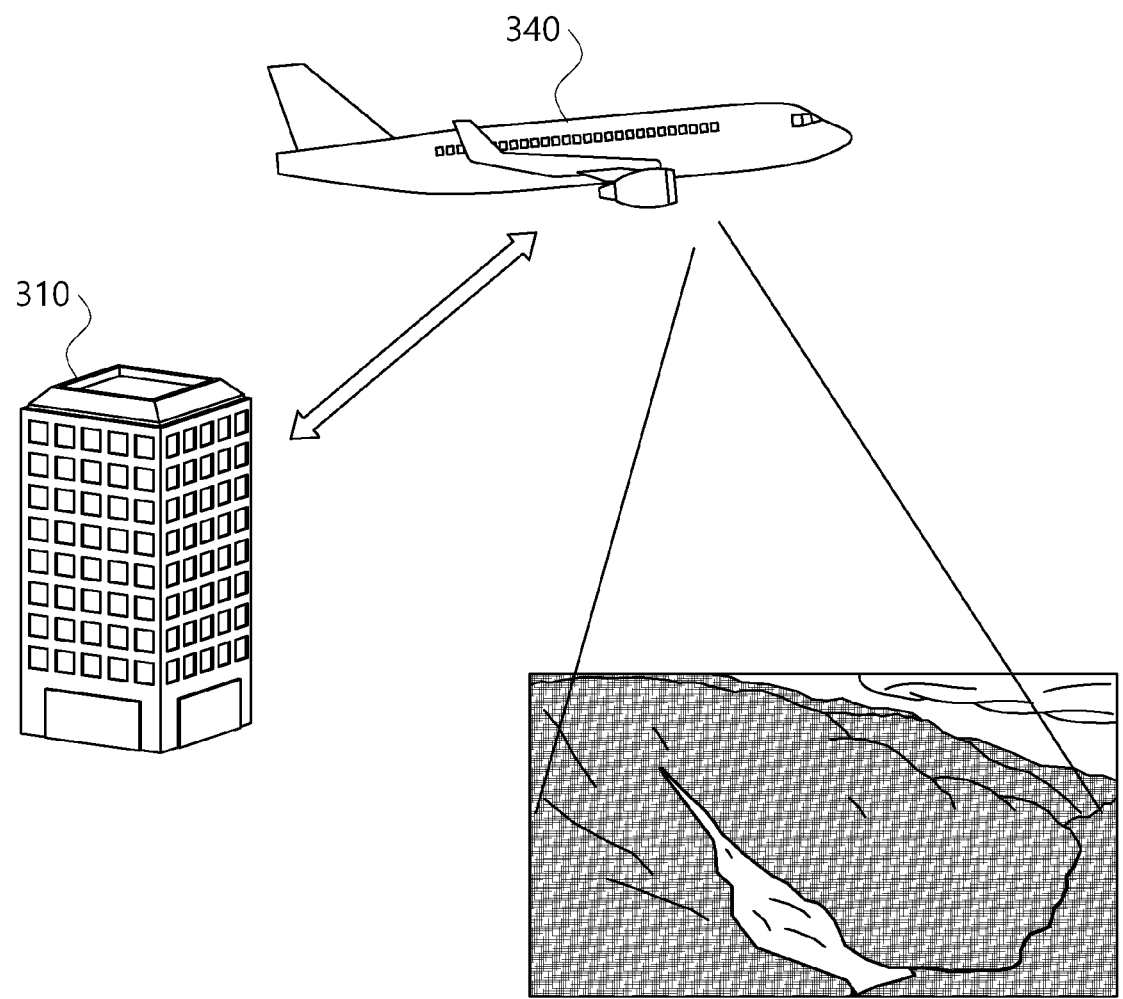

【Figure 4】
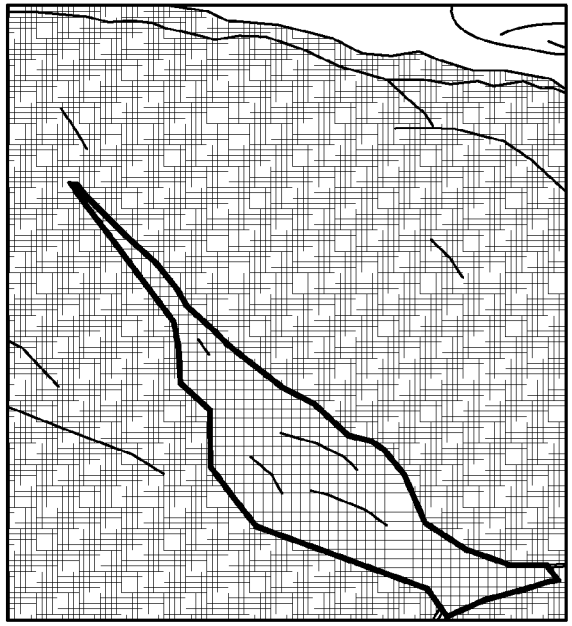
1. Affected area: Hatched
2. Type of damage: Flooding, landslide
3. Neighborhood feature: Lots of pine trees, near valley
4. Damage propagation: XX
5. Weather information at the time of disaster: Rainfall 10 mm, temperature 28°C
6. Date: 2021. 07.10
【Figure 5a】
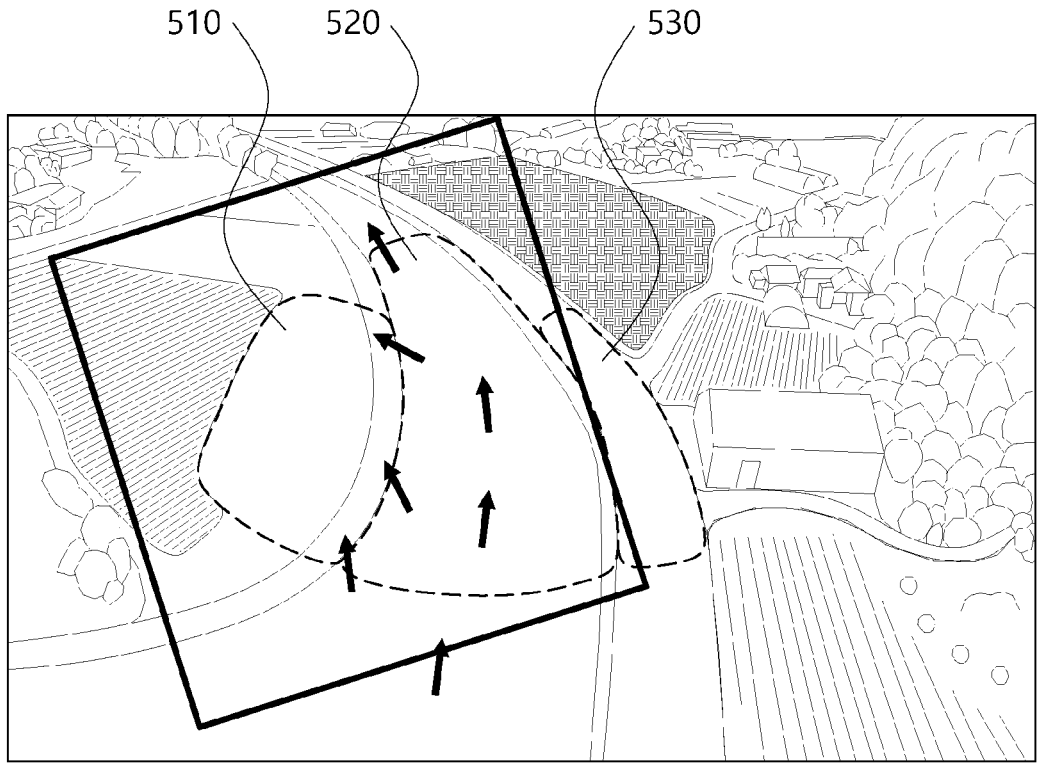

【Figure 5b】
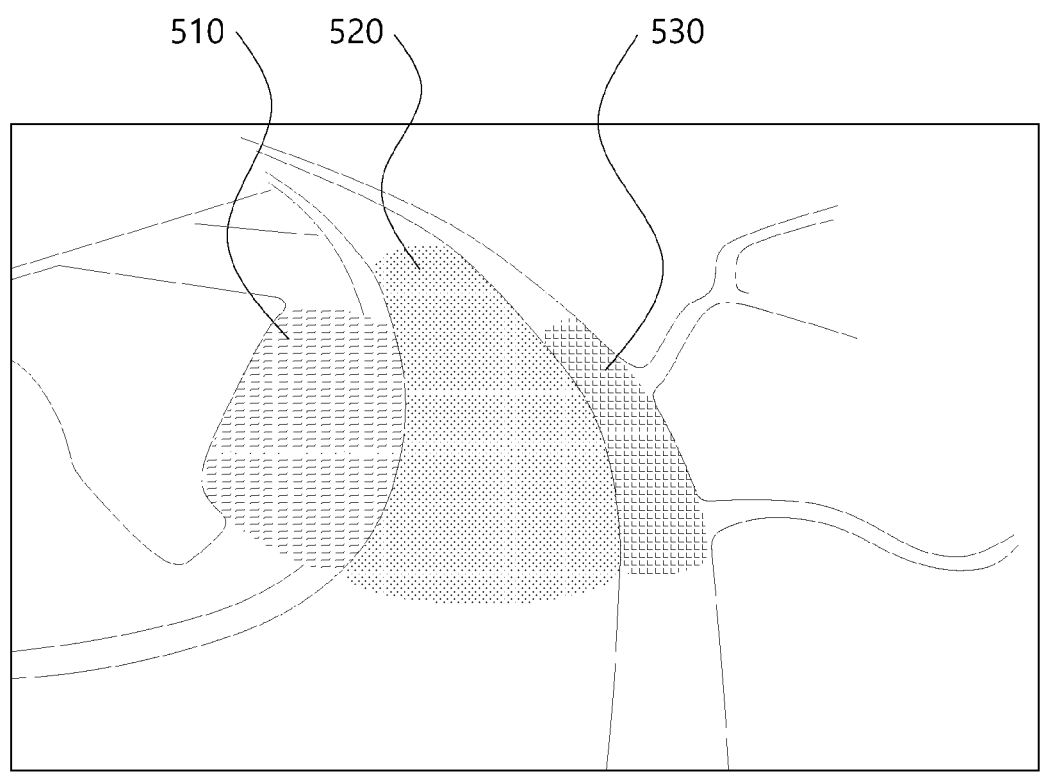

【Figure 5c】
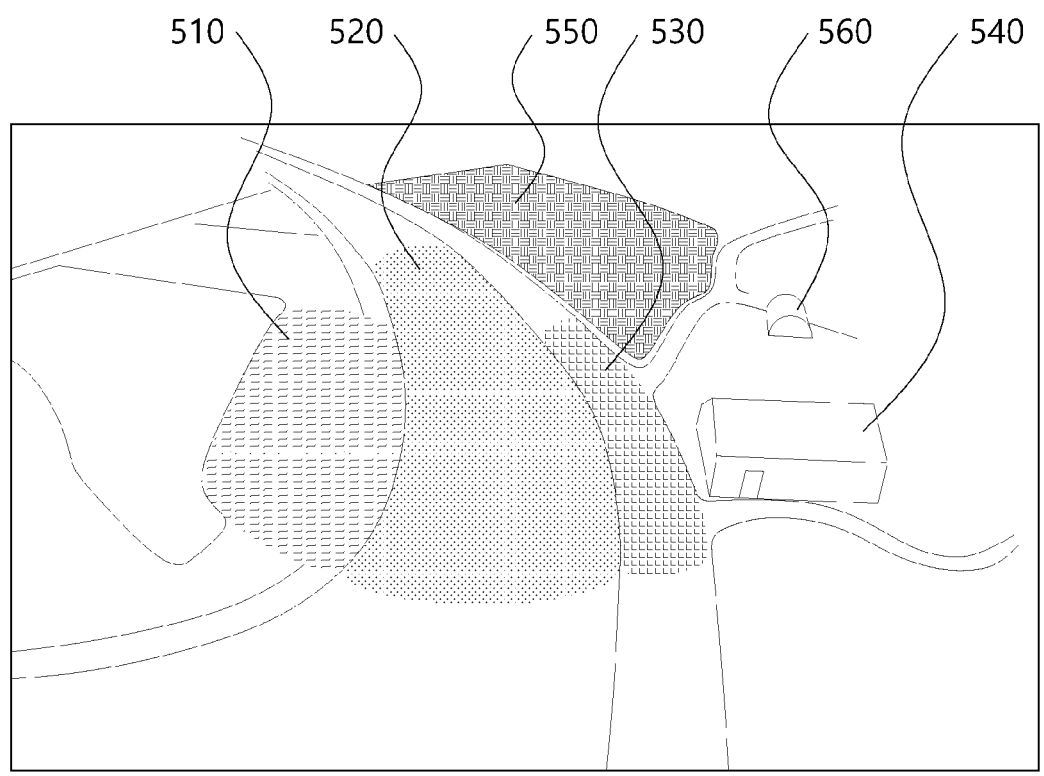

[Figure 6]
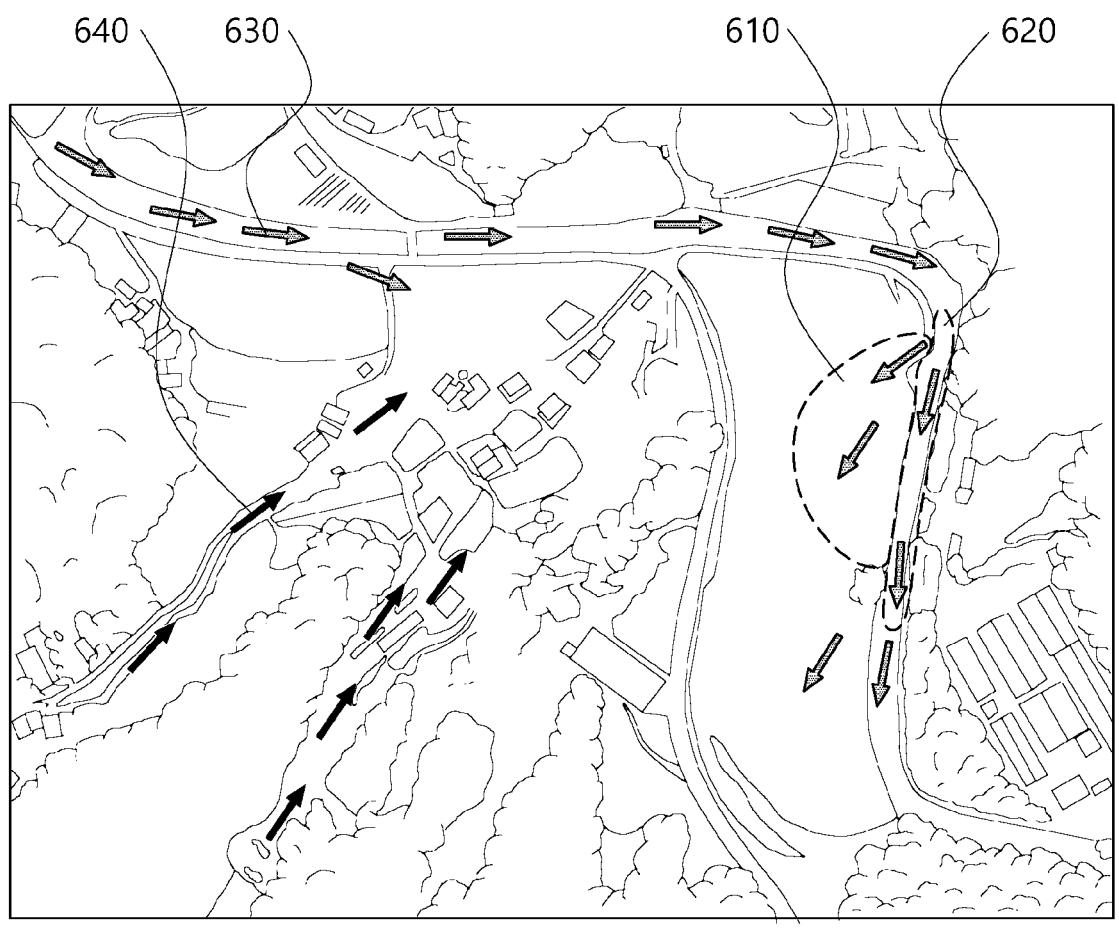

【Figure 7a】
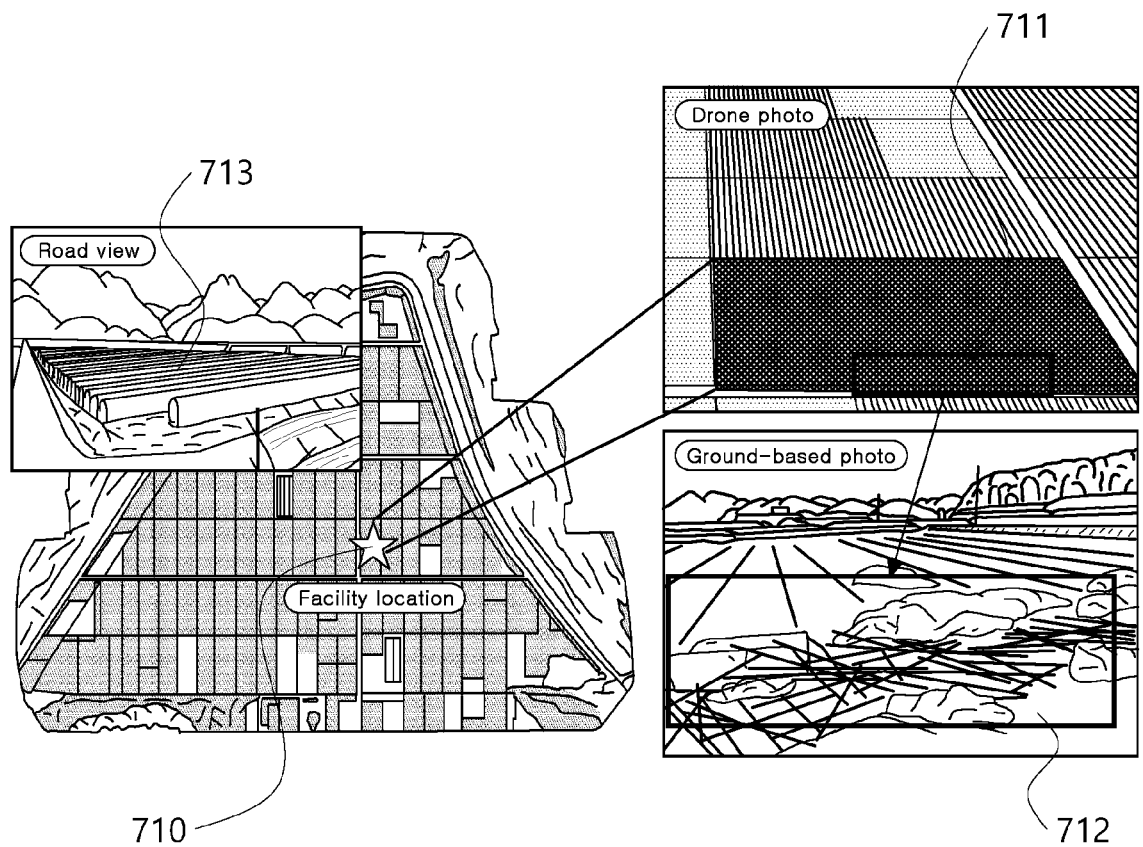

【Figure 7b】
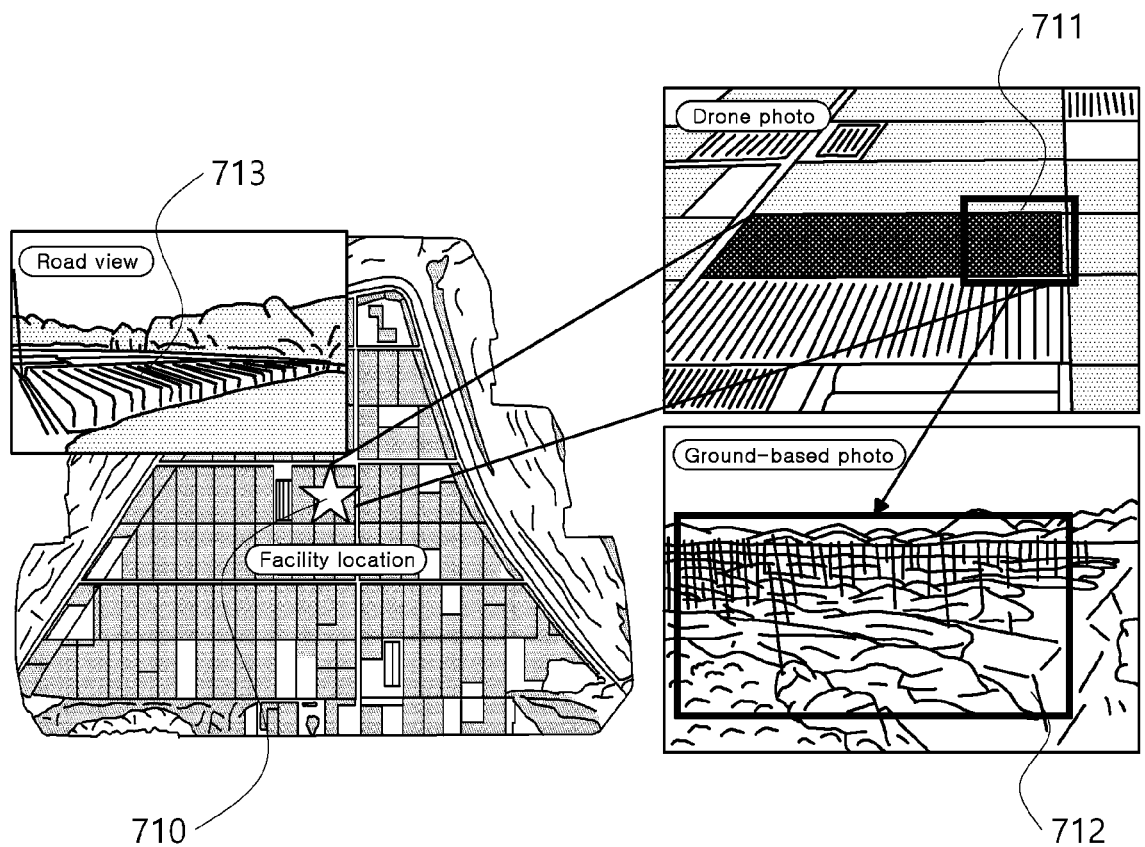

【Figure 8a】
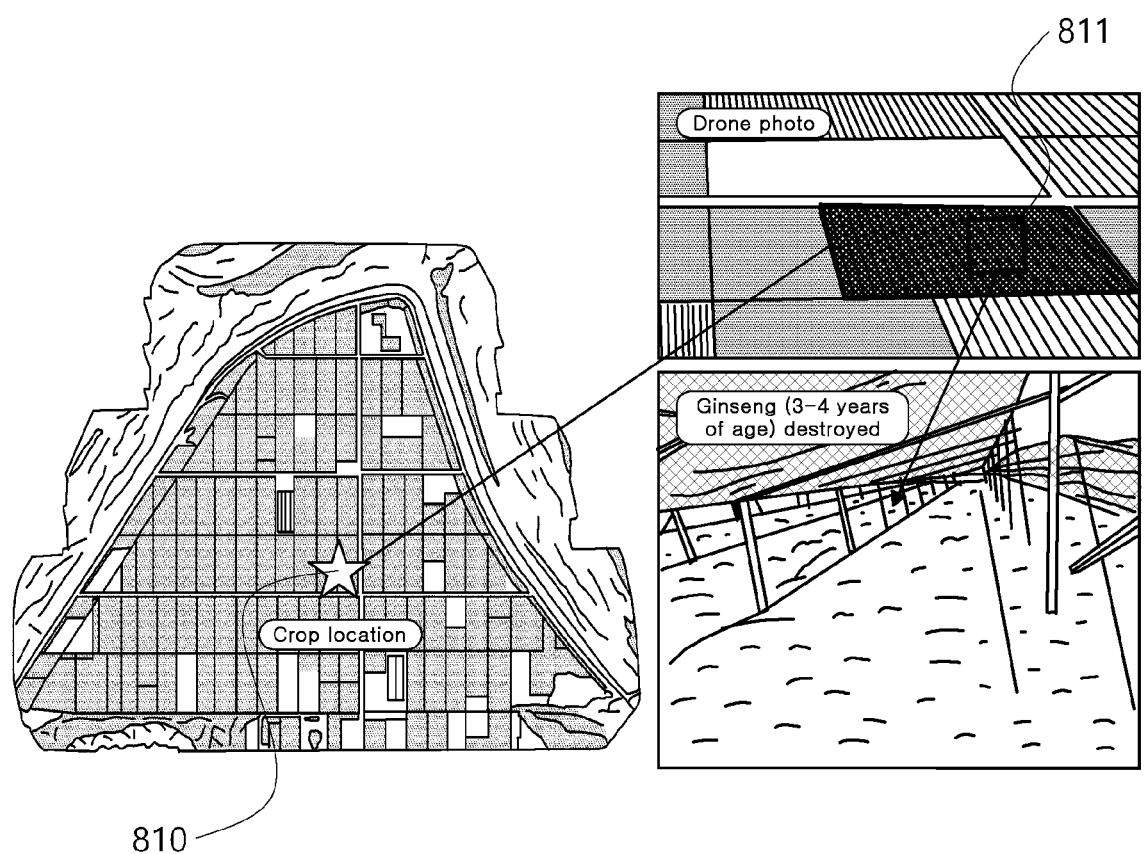

【Figure 8b】
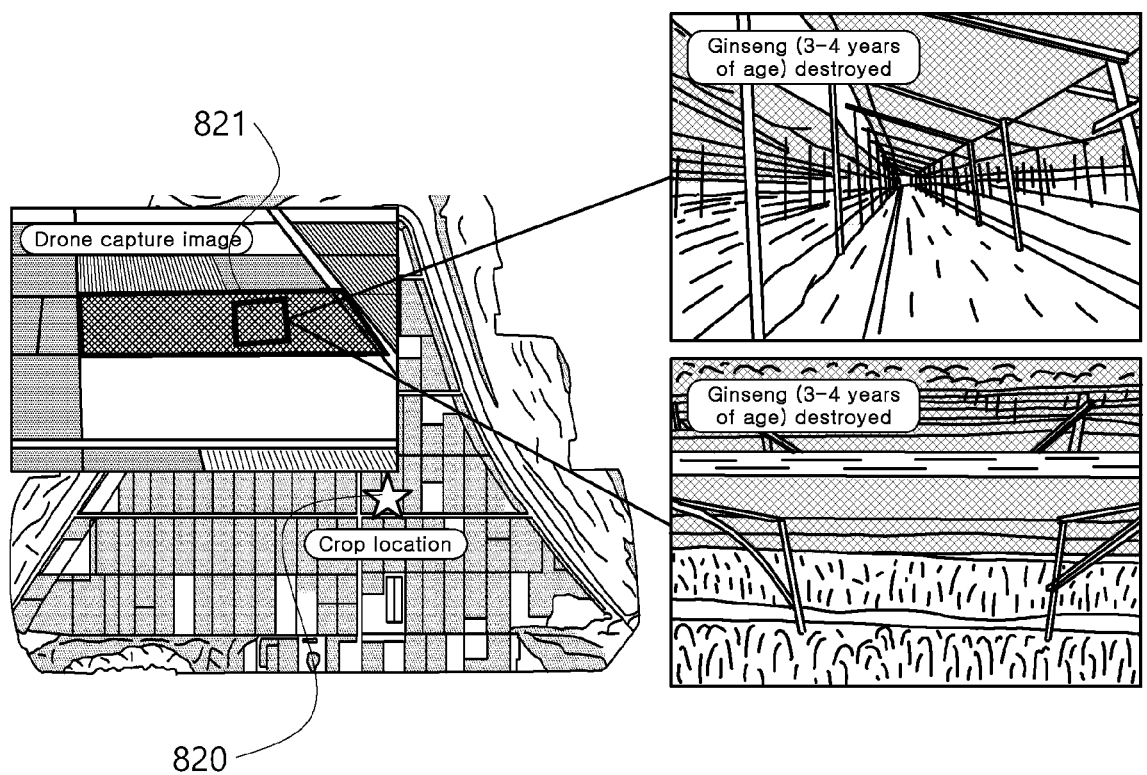

【Figure 8c】
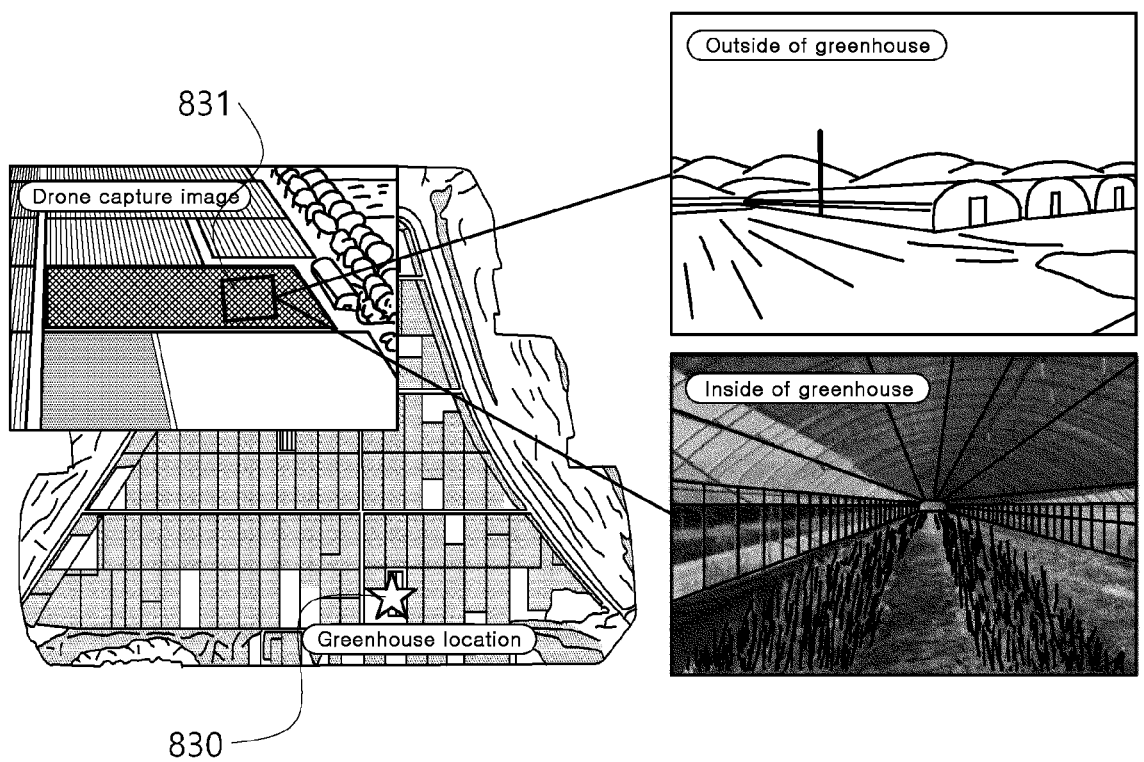

【Figure 9a】
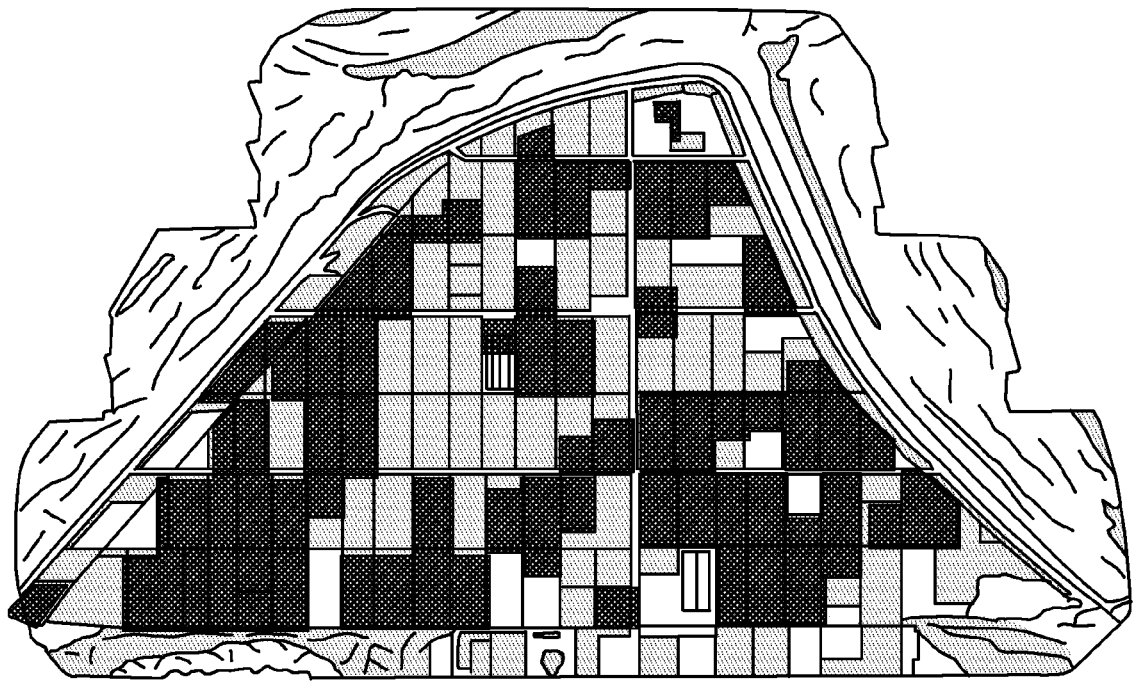
【Figure 9b】
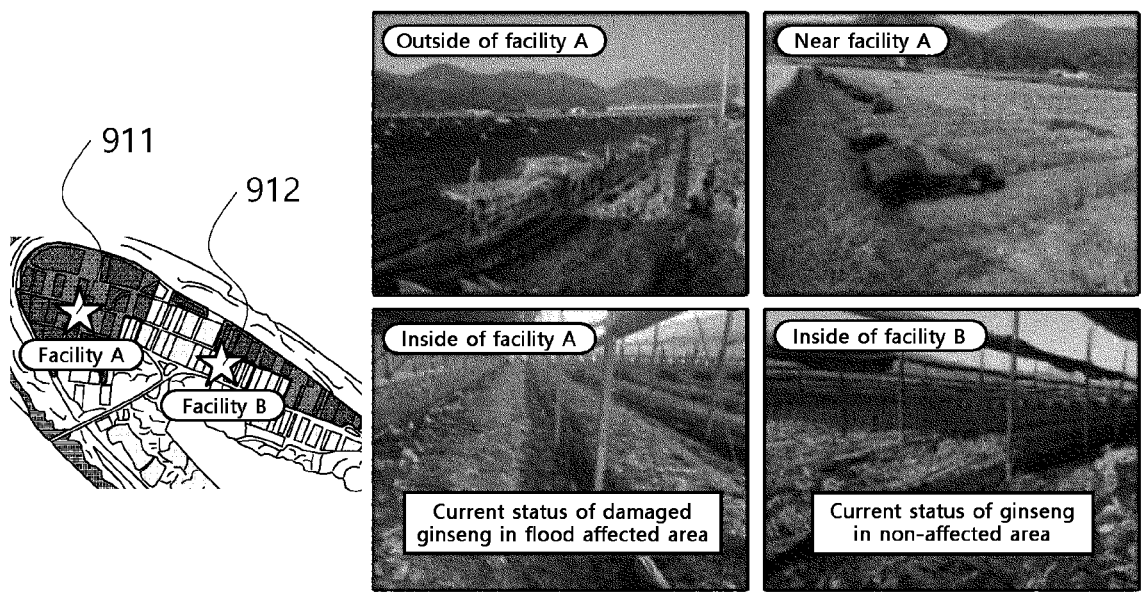

[Figure 9c]
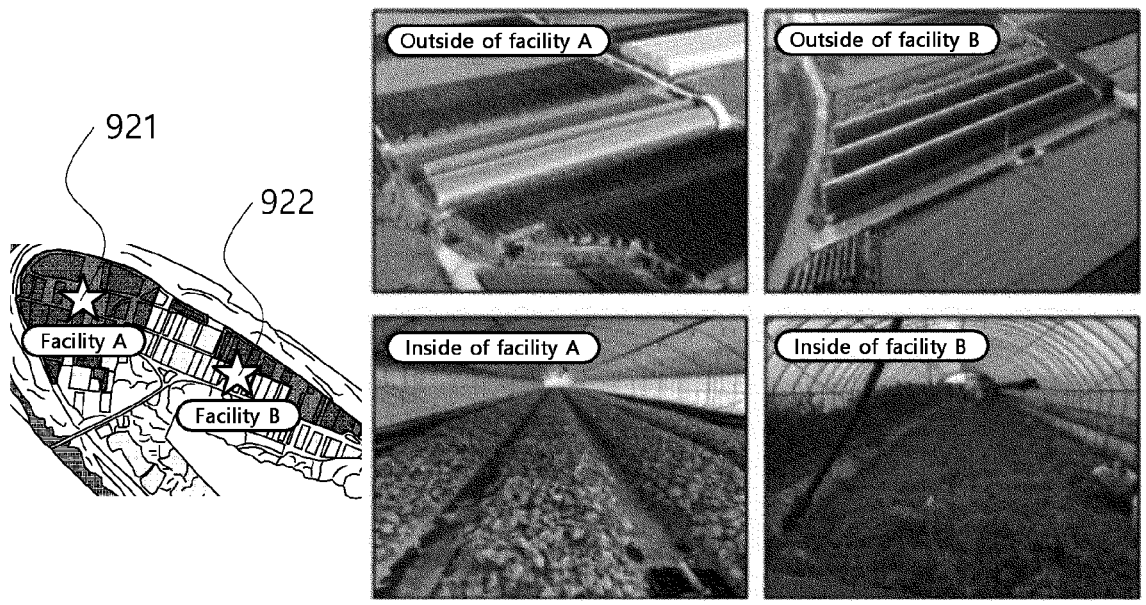

【Figure 10a】
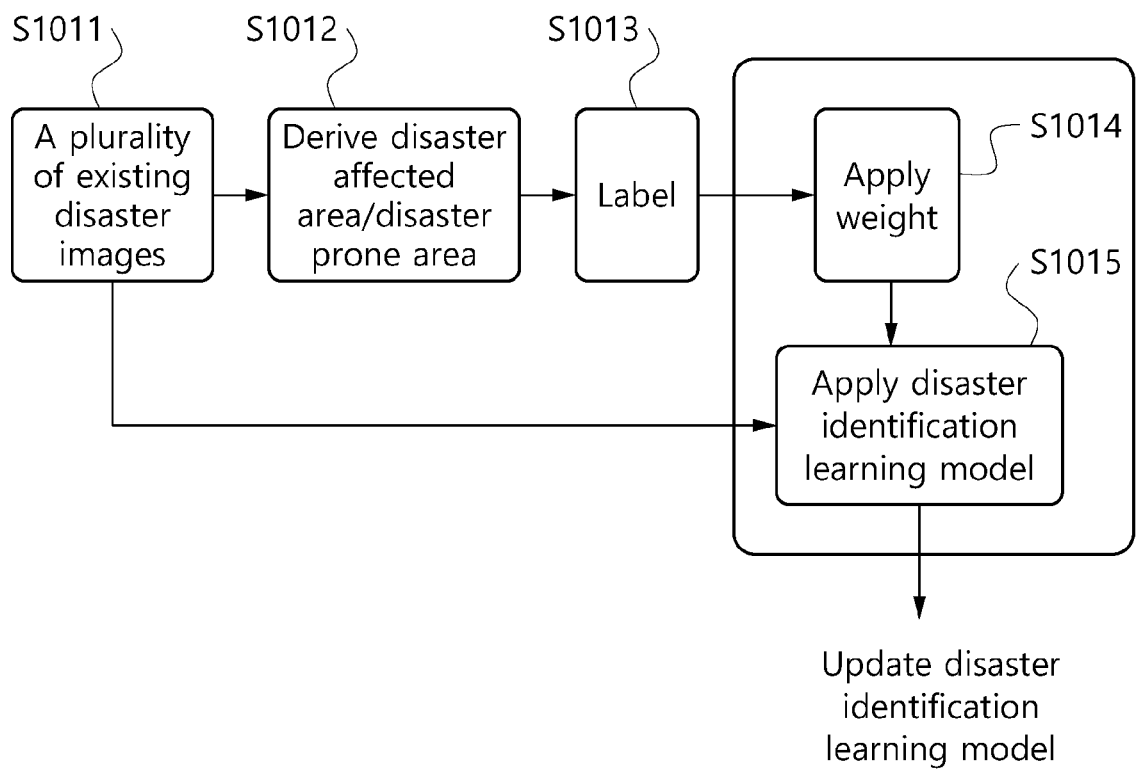

[Figure 10b]
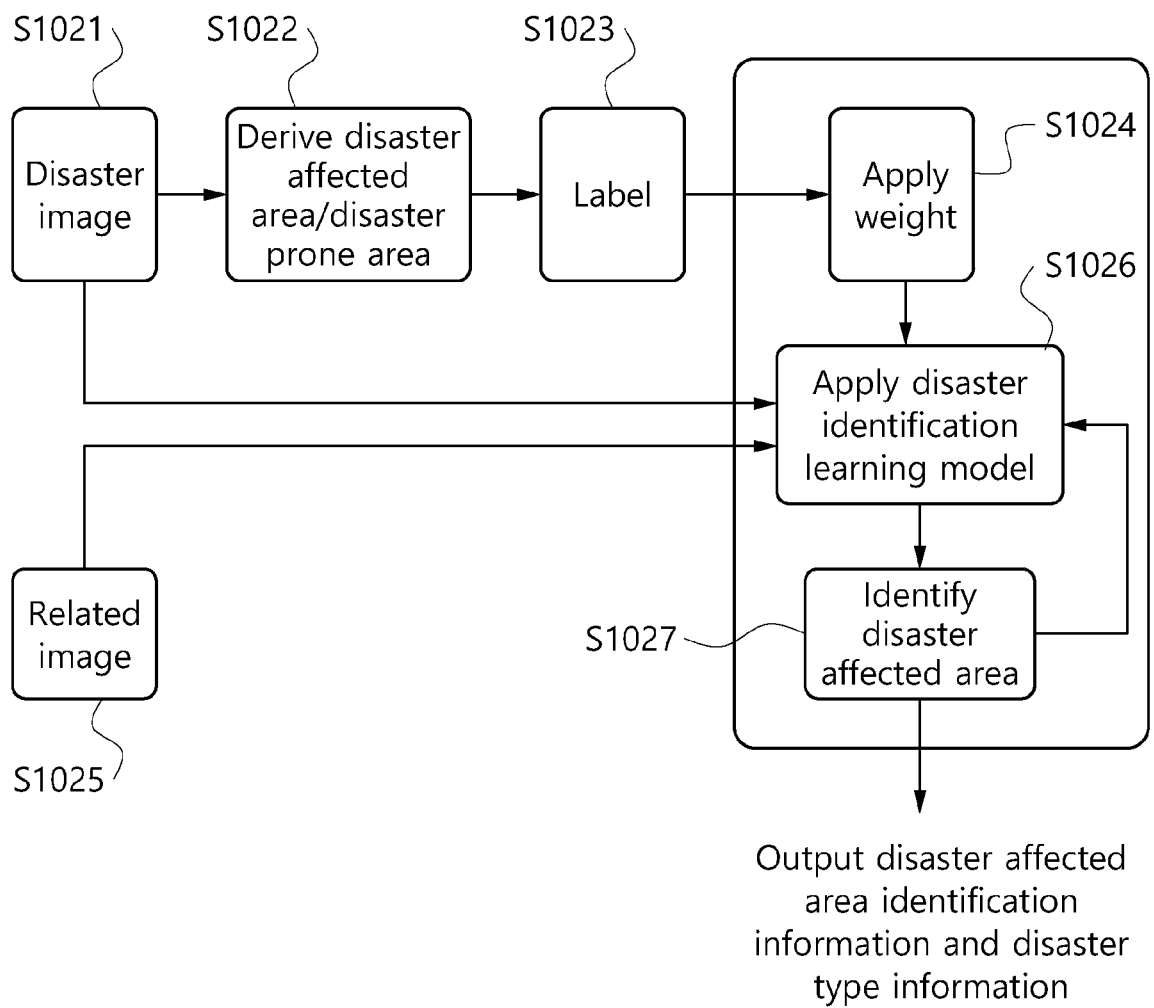

[Figure 11a]
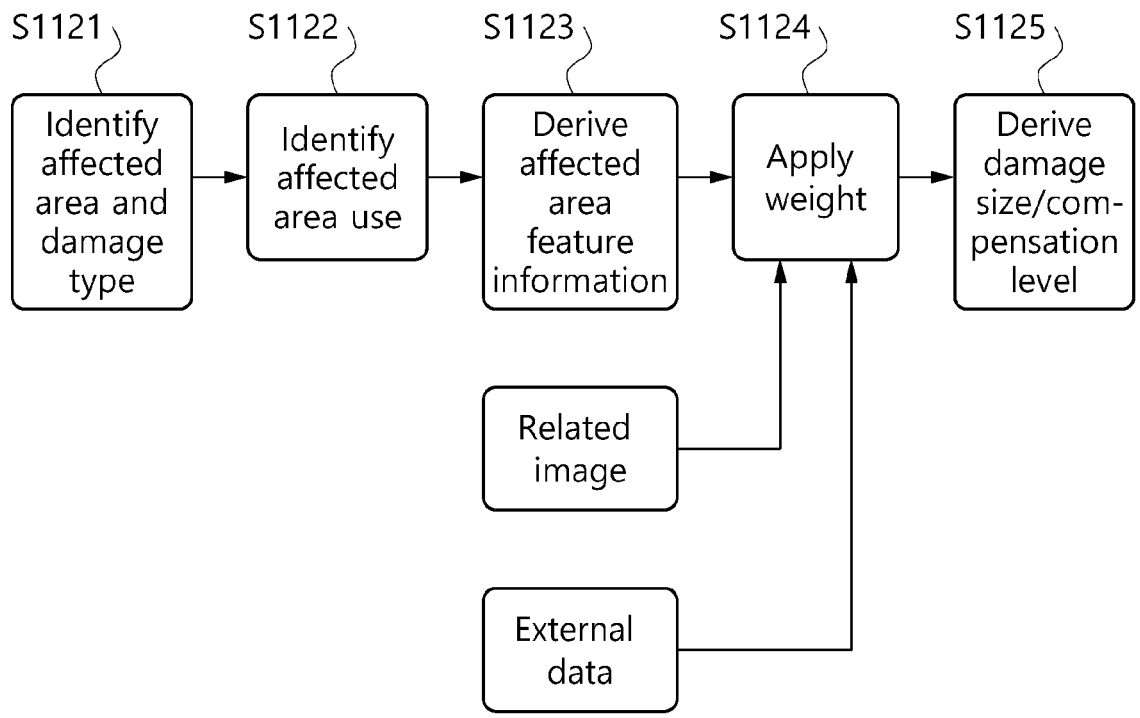

[Figure 11b]
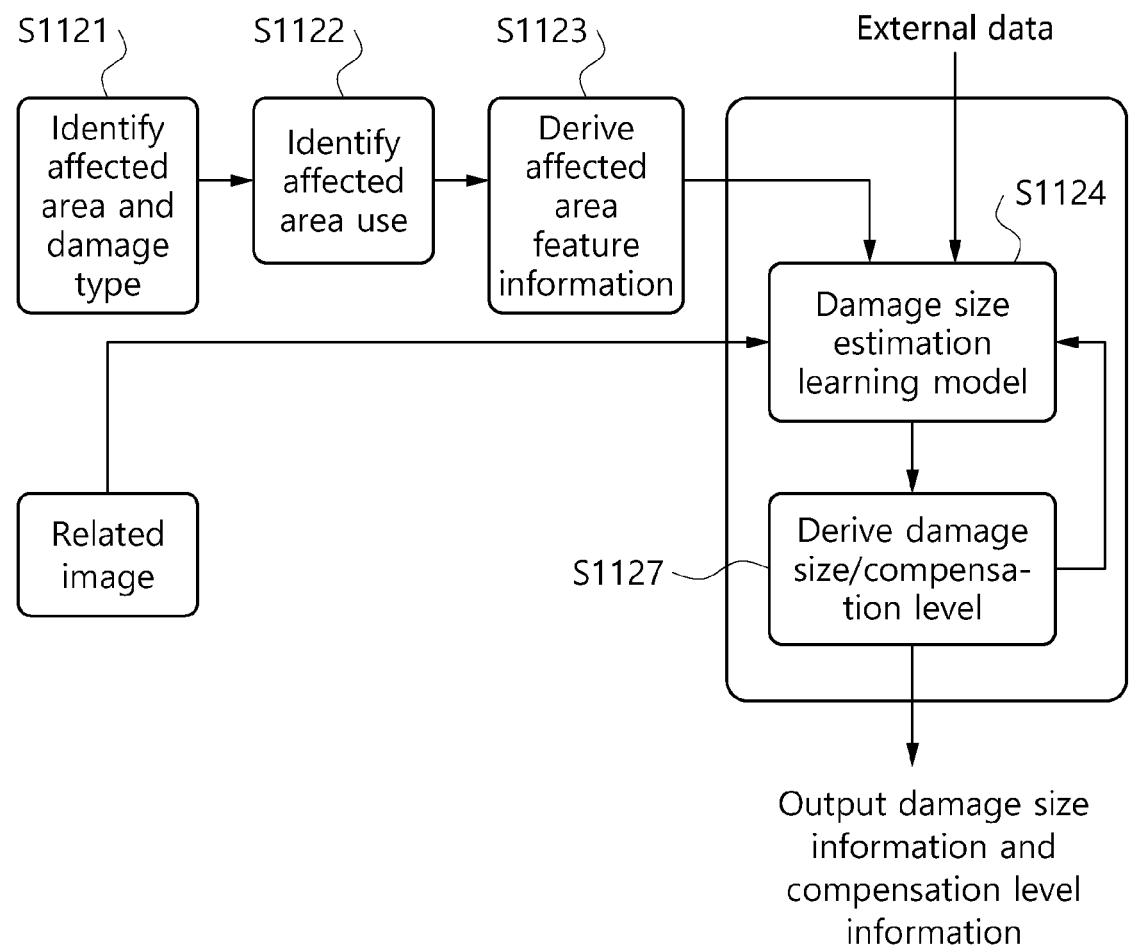

【Figure 12】
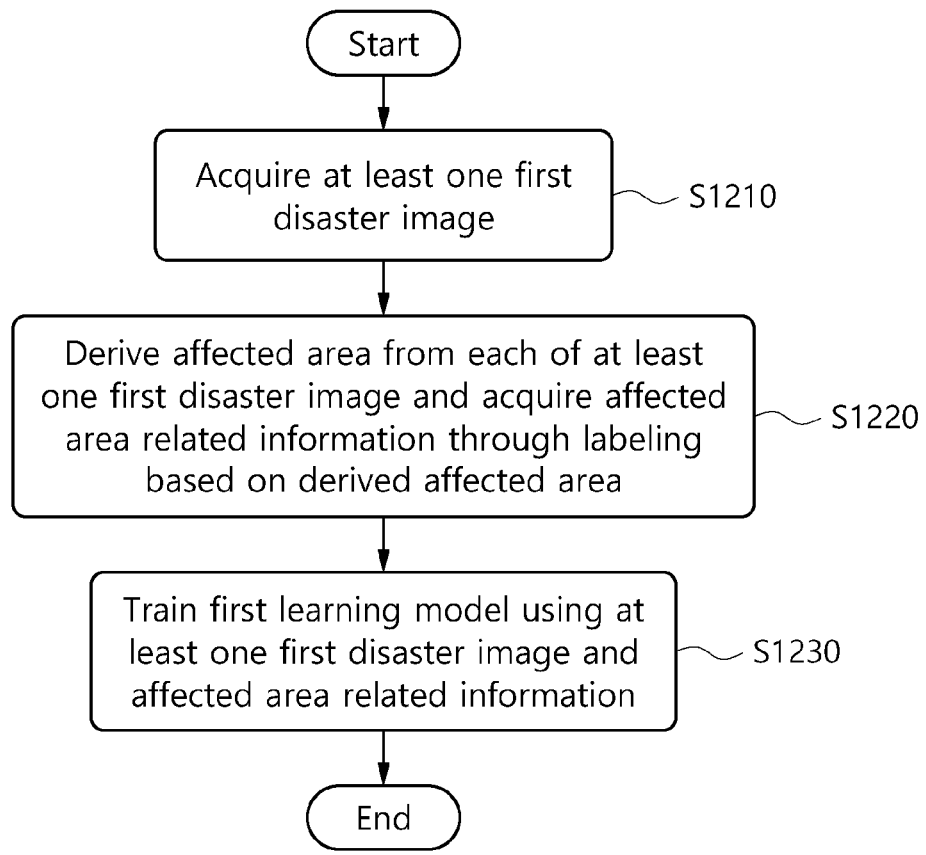

METHOD AND APPARATUS FOR ESTIMATING SIZE OF DAMAGE IN THE DISASTER AFFECTED AREAS

TECHNICAL FIELD

Embodiments relate to a method and apparatus for estimating the size of damage in disaster affected areas. More particularly, embodiments relate to a method and apparatus that identifies disaster affected areas using disaster prone area features, and estimates the size of damage and the compensation level of the identified affected areas.

BACKGROUND

When damage occurs due to disasters, for example, natural disasters, it may require lots of manual labor to identify disaster damage. Additionally, there may be limitations on identifying all information by manual labor in accurately investigating and calculating the size of the disaster damage.

In view of the foregoing description, there has been a significant development in technologies for acquiring disaster damage information by analyzing aerial images of disaster affected areas captured by drones or satellites. However, even though the aerial images of the disaster affected areas are acquired using drones or satellites, there are limitations on identifying disaster damage only using the images. Above all, disaster damage images are aerial images that roughly show disaster damage and they do not contain detailed information associated with disaster damage, so there may be limitations on identifying detailed disaster damage information. In view of the foregoing description, below is a description of a method for identifying disaster affected areas by analyzing the features of not only the disaster affected areas but also disaster prone areas through aerial images and further analyzing additional information associated with the features of the disaster prone areas based on Artificial Intelligence (AI).

Additionally, there may be a need for a method for determining the size of damage and the compensation level considering the features of the disaster affected areas after deriving the affected areas, and its description will be provided below.

SUMMARY

The present disclosure relates to a method and apparatus for identifying disaster affected areas using disaster prone area features.

The present disclosure may provide a method and apparatus that extracts feature information from disaster prone areas and identifies disaster affected areas using the extracted feature information together with disaster prone area information.

The present disclosure may provide a method and apparatus for identifying disaster affected areas through learning based on disaster affected area information and the feature information extracted from the disaster prone areas.

The present disclosure may provide a method and apparatus for outputting the range of disaster affected areas and the type of disaster damage to the input of disaster affected area images.

The present disclosure relates to a method and apparatus for estimating the size of damage and the compensation level of the disaster affected areas considering the features of the disaster affected areas.

The present disclosure relates to a method and apparatus for estimating the compensation level of the disaster affected areas considering the features of the disaster affected areas, additional data and related images.

The technical problem of the present disclosure is not limited to the foregoing description, and may be expanded to various matters that may be derived by the embodiments of the present disclosure described below.

According to an embodiment of the present disclosure, there may be provided an operation method of a server for estimating the size of damage in disaster affected areas. In this instance, the operation method of the server may include acquiring at least one first disaster image, deriving a disaster affected area from each of the at least one first disaster image, acquiring affected area related information through labeling based on the derived disaster affected area, training a first learning model using the at least one first disaster image and the affected area related information, and estimating damage size information of the disaster affected area in the disaster image based on the first learning model.

Additionally, according to an embodiment of the present disclosure, there may be provided a server for estimating the size of damage in disaster affected areas. In this instance, the server may include a transmitter/receiver which communicates with an external device, and a processor to control the transmitter/receiver, and the processor may be configured to acquire at least one first disaster image, derive a disaster affected area from each of the at least one first disaster image, acquire affected area related information through labeling based on the derived disaster affected area, train a first learning model using the at least one first disaster image and the affected area related information, and estimate damage size information of the disaster affected area in the disaster image based on the first learning model.

Additionally, the following description may be equally applied to the server for identifying the size of damage in disaster affected areas and the operation method of the server.

Additionally, according to an embodiment of the present disclosure, the operation method may further include acquiring a second disaster image from the external device, deriving a disaster affected area and a disaster prone area from the second disaster image, acquiring a plurality of disaster related information through labeling based on the derived disaster affected area and the derived disaster prone area, assigning a weight to each of the plurality of acquired disaster related information, inputting the second disaster image and the plurality of disaster related information to the trained first learning model, and outputting disaster affected area identification information and disaster damage type information based on the first learning model.

Additionally, according to an embodiment of the present disclosure, the second disaster image may be inputted to a second learning model, and the second learning model may derive the disaster affected area and the disaster prone area of the second disaster image, and provide the plurality of disaster related information as output information through the labeling based on the derived disaster affected area and the derived disaster prone area.

Additionally, according to an embodiment of the present disclosure, the operation method may further include acquiring disaster affected area use information, identifying an area of the disaster affected area, a type of the disaster affected area and a use of the disaster affected area based on the disaster affected area identification information, the disaster damage type information and the disaster affected area use information, deriving disaster affected area feature information based on the identified area of the disaster affected area, the identified type of the disaster affected area and the identified use of the disaster affected area, and identifying the damage size information based on the derived disaster affected area feature information.

Additionally, according to an embodiment of the present disclosure, the operation method may further include acquiring at least one third disaster image related to the disaster affected area and at least one external data related to the disaster affected area, and the damage size information may be identified further reflecting the at least one third disaster image and the at least one external data.

Additionally, according to an embodiment of the present disclosure, the weight may be assigned to each of the disaster affected area feature information, the at least one third disaster image and the at least one external data, and the damage size information may be identified reflecting the assigned weights.

Additionally, according to an embodiment of the present disclosure, the disaster affected area feature information, the at least one third disaster image and the at least one external data may be provided as input data of a third learning model, and the third learning model may derive the damage size information as output data based on the input data.

Additionally, according to an embodiment of the present disclosure, the damage size information may be provided to the third learning model as feedback information, and the third learning model may be updated based on the damage size information.

Additionally, according to an embodiment of the present disclosure, when the external data is provided as the input data of the third learning model, the external data may be assigned the weight and provided as the input data of the third learning model, and the server may acquire the external data from a disaster statistical database.

Additionally, according to an embodiment of the present disclosure, the server acquires the external data from the disaster statistical database, the server may identify a damage type based on the at least one first disaster image, extract at least one information corresponding to the disaster type from the disaster statistical database and acquire the at least one information as the external data, and the at least one information may include at least one of damage size information, damage frequency information, damage cost information, human loss information, damage cause information, or fault related information.

The present disclosure may provide a method for identifying disaster affected areas using disaster prone area features.

The present disclosure extracts feature information from disaster prone areas and identifies disaster affected areas using the extracted feature information together with disaster prone area information.

The present disclosure identifies disaster affected areas through learning based on disaster affected area information and the feature information extracted from the disaster prone areas.

The present disclosure outputs the range of disaster affected areas and the type of disaster damage to the input of disaster affected area images.

The present disclosure estimates the size of damage and the compensation level of the disaster affected areas considering the features of the disaster affected areas.

The present disclosure estimates the compensation level of the disaster affected areas considering the features of the disaster affected areas, additional data and related images.

The present disclosure is not limited to the foregoing description, and may be expanded to various matters that may be derived by the embodiments of the present disclosure described below.

BRIEF DESCRIPTION OF THE DRAWINGS

FIG. 1 is a diagram showing an example of an operating environment of a system according to an embodiment of the present disclosure.

FIG. 2 is a block diagram illustrating the internal configuration of a computing device 200 in an embodiment of the present disclosure.

FIG. 3A is a diagram showing a method for acquiring a disaster image in an embodiment of the present disclosure.

FIG. 3B is a diagram showing a method for acquiring a disaster image in an embodiment of the present disclosure.

FIG. 3C is a diagram showing a method for acquiring a disaster image in an embodiment of the present disclosure.

FIG. 4 is a diagram showing a method for labeling a disaster image in an embodiment of the present disclosure.

FIG. 5A is a diagram showing a method for identifying a disaster affected area and a disaster prone area in an embodiment of the present disclosure.

FIG. 5B is a diagram showing a method for identifying a disaster affected area and a disaster prone area in an embodiment of the present disclosure.

FIG. 5C is a diagram showing a method for identifying a disaster affected area and a disaster prone area in an embodiment of the present disclosure.

FIG. 6 is a diagram showing a method for extracting the features of a disaster prone area in an embodiment of the present disclosure.

FIG. 7A is a diagram showing a method for identifying the size of damage based on a disaster affected area in an embodiment of the present disclosure.

FIG. 7B is a diagram showing a method for identifying the size of damage based on a disaster affected area in an embodiment of the present disclosure.

FIG. 8A is a diagram showing a method for identifying the size of damage based on a disaster affected area in an embodiment of the present disclosure.

FIG. 8B is a diagram showing a method for identifying the size of damage based on a disaster affected area in an embodiment of the present disclosure.

FIG. 8C is a diagram showing a method for identifying the size of damage based on a disaster affected area in an embodiment of the present disclosure.

FIG. 9A is a diagram showing a method for identifying the size of damage based on a disaster affected area in an embodiment of the present disclosure.

FIG. 9B is a diagram showing a method for identifying the size of damage based on a disaster affected area in an embodiment of the present disclosure.

FIG. 9C is a diagram showing a method for identifying the size of damage based on a disaster affected area in an embodiment of the present disclosure.

FIG. 10A is a diagram showing a method for building a learning model based on disaster images in an embodiment of the present disclosure.

FIG. 10B is a diagram showing a method for building a leaning model based on disaster images in an embodiment of the present disclosure.

FIG. 11A is a diagram showing a method for determining the size of disaster damage and the compensation level based on a disaster affected area in an embodiment of the present disclosure.

FIG. 11B is a diagram showing a method for determining the size of disaster damage and the compensation level based on a disaster affected area in an embodiment of the present disclosure.

FIG. 12 is a flowchart showing a method for identifying a disaster affected area in an embodiment of the present disclosure.

DETAILED DESCRIPTION OF THE EMBODIMENTS

In describing an embodiment of the present disclosure, when a certain detailed description of well-known elements or functions is determined to make the subject matter of an embodiment of the present disclosure ambiguous, the detailed description is omitted. Additionally, in the drawings, elements irrelevant to the description of an embodiment of the present disclosure are omitted, and like reference signs are affixed to like elements.

In an embodiment of the present disclosure, when an element is referred to as being "connected", "coupled" or "linked" to another element, this may include not only a direct connection relationship but also an indirect connection relationship in which intervening elements are present. Additionally, unless expressly stated to the contrary, "comprise" or "include" when used in this specification, specifies the presence of stated elements but does not preclude the presence or addition of one or more other elements.

In an embodiment of the present disclosure, the terms "first", "second" and the like are used to distinguish an element from another, and do not limit the order or importance between elements unless otherwise mentioned. Accordingly, a first element in an embodiment may be referred to as a second element in other element within the scope of embodiments of the present disclosure, and likewise, a second element in an embodiment may be referred to as a first element in other embodiment.

In an embodiment of the present disclosure, the distinguishable elements are intended to clearly describe the feature of each element, and do not necessarily represent the separated elements. That is, a plurality of elements may be integrated into one hardware or software, and an element may be distributed to multiple hardware or software. Accordingly, although not explicitly mentioned, the integrated or distributed embodiment is included in the scope of embodiments of the present disclosure.

In the specification, a network may be a concept including a wired network and a wireless network. In this instance, the network may refer to a communication network that allows data exchange between a device and a system and between devices, and is not limited to a particular network.

The embodiment described herein may have aspects of entirely hardware, partly hardware and partly software, or entirely software. In the specification, "unit", "apparatus" or "system" refers to a computer related entity such as hardware, a combination of hardware and software, or software. For example, the unit, module, apparatus or system as used herein may be a process being executed, a processor, an object, an executable, a thread of execution, a program and/or a computer, but is not limited thereto. For example, both an application running on a computer and the computer may correspond to the unit, module, apparatus or system used herein.

Additionally, the device as used herein may be a mobile device such as a smartphone, a tablet PC, a wearable device and a Head Mounted Display (HMD) as well as a fixed device such as a PC or an electronic device having a display function. Additionally, for example, the device may be an automotive cluster or an Internet of Things (IoT) device. That is, the device as used herein may refer to devices on which the application can run, and is not limited to a particular type. In the following description, for convenience of description, a device on which the application runs is referred to as the device.

In the present disclosure, there is no limitation in the communication method of the network, and a connection between each element may not be made by the same network method. The network may include a communication method using a communication network (for example, a mobile communication network, a wired Internet, a wireless Internet, a broadcast network, a satellite network, etc.) as well as near-field wireless communication between devices. For example, the network may include all communication methods that enable networking between objects, and is not limited to wired communication, wireless communication, 3G, 4G, 5G, or any other methods. For example, the wired and/or wireless network may refer to a communication network by at least one communication method selected from the group consisting of Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VOIP), LTE Advanced, IEEE802.16m, WirelessMAN-Advanced, HSPA+, 3GPP Long Term Evolution (LTE), Mobile WiMAX (IEEE 802.16e), UMB (formerly EV-DO Rev. C), Flash-OFDM, iBurst and MBWA (IEEE 802.20) systems, HIPERMAN, Beam-Division Multiple Access (BDMA), World Interoperability for Microwave Access (Wi-MAX) or communication using ultrasonic waves, but is not limited thereto.

The elements described in a variety of embodiments are not necessarily essential, and some elements may be optional. Accordingly, an embodiment including some of the elements described in the embodiment is also included in the scope of embodiments of the present disclosure. Additionally, in addition to the elements described in a variety of embodiments, an embodiment further including other elements is also included in the scope of embodiments of the present disclosure.

Hereinafter, the embodiments of the present disclosure will be described in detail with reference to the accompanying drawings.

FIG. 1 is a diagram showing an example of an operating environment of a system according to an embodiment of the present disclosure. Referring to FIG. 1, a user device 110 and at least one server 120, 130, 140 are connected via a network 1. FIG. 1 is provided by way of illustration, and the number of user devices or servers is not limited to FIG. 1.

The user device 110 may be a fixed or mobile terminal incorporated into a computer system. The user device 110 may include, for example, a smartphone, a mobile phone, a navigation, a computer, a laptop computer, a digital broadcasting terminal, a Personal Digital Assistant (PDA), a Portable Multimedia Player (PMP), a tablet PC, a game console, a wearable device, an IoT device, a virtual reality (VR) device and an augmented reality (AR) device. For example, in embodiments, the user device 110 may substantially refer to one of a variety of physical computer systems that can communicate with the servers 120-140 via the network 1 using a wireless or wired communication method.

Each server may be incorporated into a computer device or a plurality of computer devices capable of providing commands, code, files, content and services by communication with the user device 110 via the network 1. For example, the server may be a system that provides each service to the user device 110 having accessed via the network 1. In a more specific example, the server may provide an intended service (for example, information provision) of an application as a computer program installed and running on the user device 110 to the user device 110 through the corresponding application. In another example, the server may distribute a file for installing and running the above-described application to the user device 110, receive user input information and provide a corresponding service. In an example, in the following description, each server may operate based on any one of the servers of FIG. 1. The server may be a subject that communicates with at least one of another device, a drone, a satellite or an airplane and acquires data via the network and acquires data. Additionally, the terminal that receives disaster damage identification information may be one of the users of FIG. 1. In another example, the drone, satellite and airplane may communicate with another terminal or server based on the network of FIG. 1. That is, the subjects may operate in a manner of communicating with each other via the network and exchanging data, and is not limited to the above-described embodiment.

FIG. 2 is a block diagram illustrating the internal configuration of a computing device 200 in an embodiment of the present disclosure. The computing device 200 may be applied to the at least one user device 110-1, 110-2 or server 120-140 described above with reference to FIG. 1, and each device and each server may have identical or similar internal configuration by adding or removing some components.

Referring to FIG. 2, the computing device 200 may include a memory 210, a processor 220, a communication module 230 and a transmitter/receiver 240. The memory 210 is a non-transitory computer-readable recording medium, and may include a permanent mass storage device such as random access memory (RAM), read only memory (ROM), disk drive, solid state drive (SSD) and flash memory. Here, the permanent mass storage device such as ROM, SSD, flash memory and disk drive is a separate permanent storage device that is different from the memory 210, and may be included in the above-described device or server. Additionally, the memory 210 may store an operating system and at least one program code (for example, code for a browser installed and running on the user device 110 or an application installed in the user device 110 to provide a specific service). These software components may be loaded from a separate computer-readable recording medium other than the memory 210. The separate computer-readable recording medium may include a computer-readable recording medium such as a floppy drive, a disc, a tape, a DVD/CD-ROM drive and a memory card.

In another embodiment, the software components may be loaded on the memory 210 through the communication module 230, not the computer-readable recording medium. For example, at least one program may be loaded on the memory 210 based on the computer program (for example, the above-described application) installed by files provided via the network 1 by developers or file distribution systems (for example, the above-described servers) which distribute application installer files.

The processor 220 may be configured to process the instructions of the computer program by performing the basic arithmetic, logical and input/output calculation. The instructions may be provided to the processor 220 by the memory 210 or the communication module 230. For example, the processor 220 may be configured to execute the received instructions according to the program code stored in the recording device such as the memory 210.

The communication module 230 may provide a function for communication between the user device 110 and the server 120-140 via the network 1, and may provide a function for communication between each of the device 110 and/or the server 120-140 and another electronic device.

The transmitter/receiver 240 may be a means for interfacing with an external input/output device (not shown). For example, the external input device may include a keyboard, a mouse, a microphone and a camera, and the external output device may include a display, a speaker and a haptic feedback device.

In another example, the transmitter/receiver 240 may be a means for interfacing with a device having an integrated function for input and output such as a touch screen.

Additionally, in other embodiments, the computing device 200 may include a larger number of components than the components of FIG. 2 depending on the nature of devices to which the computing device 200 is applied. For example, when the computing device 200 is applied to the user device 110, the computing device 200 may include at least some of the above-described input/output devices, or may further include other components such as a transceiver, a Global Positioning System (GPS) module, a camera, various types of sensors and a database. In a more specific example, when the user device is a smartphone, the computing device 200 may further include a variety of components commonly included in the smartphone such as an acceleration sensor or a gyro sensor, a camera module, various types of physical buttons, buttons using a touch panel, an input/output port and a vibrator for vibration.

In an example, in the following description, the terminal, drone, satellite and airplane may be devices that operate based on FIG. 2. That is, the terminal, drone, satellite and airplane as described below may be subjects that connect to and communicate with the server via the network based on FIG. 1.

Here, each subject may be a computing device that operates, including the memory, the processor, the communication module and the transmitter/receiver based on FIG. 2 and any other components, and may not be limited to a particular computing device.

In an example, when disasters (for example, deluge, fire, earthquake overflow, flood, collapse, etc.) occur, images or videos of areas at which the disasters occurred may be acquired using at least one of the drone, the satellite or the airplane. That is, at least one of the drone, the satellite or the airplane may capture the images of the areas at which the disasters occurred, and transmit the images to the server. The server may identify disaster affected areas and the types of disaster damage through the received images. In this instance, the server may include a disaster identification learning model, and the received images (or videos, hereinafter referred to as the images) may be applied to the disaster identification learning model as the input, and disaster affected area identification information and disaster damage type information may be provided as the output of the disaster identification learning model. In an example, the server may provide the disaster affected area identification information and the disaster damage type information to the terminal or the device, and the terminal and the device may use the received information. Additionally, the server may estimate damage size information of the disaster affected areas in the disaster images based on the learning model.

However, in an example, learning through a large amount of data may be necessary for the disaster identification learning model to accurately identify the disaster affected areas and the types of disaster damage. However, since disasters do not often occur, insufficient data of disaster images may be the hurdle for learning. Additionally, in an example, learning based on the disaster identification learning model needs to reflect the features of disaster affected areas and disaster prone areas, thereby increasing accuracy in identifying affected areas.

In view of the foregoing description, below is a description of the advanced method of the disaster identification learning model that outputs the range of disaster areas and the type of disaster damage to the input of disaster images as aerial images.

Here, in an example, the disaster images may be aerial images. More specifically, referring to FIG. 3A, the server 310 may acquire the aerial image of the disaster area from the drone 320. In an example, the drone is a small flying object and can freely fly in the air to acquire the disaster image as the aerial image. Additionally, the server 310 may be a device including the disaster identification learning model to identify disaster affected areas, but is not limited to a particular type.

In another example, referring to FIG. 3B, the server 310 may acquire the aerial image of the disaster area from the satellite 330. In another example, referring to FIG. 3C, the aerial image may be an image acquired through the airplane 330. Here, in an example, the server 310 may acquire the disaster image through at least one of FIGS. 3A to 3C, and is not limited to a particular type. Additionally, the server 310 may acquire a plurality of disaster images through a plurality of devices, and may use the plurality of disaster images. Additionally, in an example, the server 310 may acquire disaster images in other formats from other devices. In an example, the server 310 may acquire images in other formats for the same area as the affected area at which the disaster images are captured as the aerial images. Here, the images in other formats may be close-up images of the affected area, map images, geographical images or any other images, and is not limited to a particular type.

That is, the server 310 may acquire the aerial images as the disaster images based on FIGS. 3A to 3C, and may acquire the images in other formats through other devices or a database, and is not limited to the above-described embodiment.

Here, the disaster identification learning model of the server may derive and provide disaster affected area identification information and disaster damage type information as an output value to the input of the at least one disaster image acquired through the foregoing description.

However, since disasters do not often occur as described above, sample data for training the disaster identification learning model may be insufficient. Additionally, to provide an accurate output value for the disaster images, it is necessary to reflect domestic geographical information or any other feature information on the disaster identification learning model as described above.

In view of the foregoing description, the disaster identification learning model may be pre-trained based on a plurality of existing disaster images. That is, the disaster identification learning model may be built as a learning model for identifying disaster affected areas through training using the existing disaster images as sample data.

However, in an example, when the disaster identification learning model is only trained with the disaster images as the input, sample data may be insufficient, resulting in limited advanced learning. In view of the foregoing description, the disaster images may be labelled, and labeling information may be used as the input of the disaster identification learning model. In another example, disaster affected area information and disaster prone area information may be extracted from the disaster images and used as the input of the disaster identification learning model.

Here, in an example, referring to FIG. 4, the labeling of the disaster image may be performed in relation to the disaster affected area in the disaster image. That is, the disaster affected area may be derived from the disaster image, and a plurality of damage related information may be generated through labeling based on the derived affected area.

In an example, referring to FIG. 4, the plurality of damage related information generated through labeling in relation to the disaster image may include at least one of affected area information, damage type information, neighborhood feature information, damage propagation information, weather information at the time of the disaster or any other information.

In an example, the disaster image may be an image related to the past disaster as described above. That is, the damage related information acquired through labeling may exist as record information related to the past disaster image. The server may acquire the above-described disaster image related record information, and perform labelling for each disaster image based on the same. Here, each of the labeled disaster image and the labeling information may be used as the input for advanced training of the above-described disaster identification learning model.

In this instance, the disaster identification learning model may be trained with the plurality of disaster images and the damage related information acquired through labeling as the input. When the disaster identification learning model is trained, the disaster identification learning model may perform matching between the disaster image and the damage related information acquired through labeling and perform weighting for each damage related information. In a more specific example, the disaster identification learning model may identify the damage related information through labeling of the disaster images occurred at or above 30° C. in the summer among the plurality of disaster images, and derive common and specific information for each disaster based on the corresponding information. Subsequently, the disaster identification learning model may be trained based on a process of matching the derived common and specific information to each disaster image.

Here, in an example, the server may use an information derivation learning model to derive the affected areas from the existing disaster images and generate the damage related information through labeling. That is, the server may include another learning model that is different from the disaster identification learning model. Here, the information derivation learning model may output the affected area and the damage related information through labeling for each disaster image to the input of each existing disaster image.

Subsequently, the server may use the disaster affected area and the damage related information derived through the information derivation learning model as the input information of the disaster identification learning model together with the disaster images. The disaster identification learning model may provide the disaster affected area identification information and the disaster damage type information as the output information based on the above-described input information.

In another example, the advanced training of the disaster identification learning model may be performed by deriving the disaster affected area and the disaster prone area adjacent to the disaster affected area from the disaster image, and acquiring the information through labeling based on the same as described above. In an example, the disaster affected area and the disaster prone area may be derived from the disaster image to train the disaster identification learning model. In this instance, damage type information (for example, flood, landslide) of the disaster affected area and neighborhood feature information (for example, hill, forest, pine tree, valley, bridge, paddy field, ginseng farm) adjacent to the disaster affected area may be derived through labeling, and the corresponding information may be used as training data.

More specifically, FIGS. 5A to 5C are diagrams showing a method for identifying the disaster affected area and the disaster prone area in an embodiment of the present disclosure. Referring to FIGS. 5A and 5B, the disaster affected area 510 and the disaster prone area 520 may be derived from the disaster image. In an example, the server may derive the disaster affected area 510 and the disaster prone area 520, 530 through the above-described information derivation learning model. In a specific example, in FIGS. 5A and 5B, the disaster affected area 510 may be a flood affected area and the disaster damage type information may be flooding. However, this is provided by way of illustration, and any other disaster damage may be contemplated. In this instance, in an example, the server may derive feature information of each of the disaster affected area 510 and the disaster prone area 520, 530 through labeling. Here, the disaster prone area 520, 530 may be a plurality of areas, and each disaster prone area 520, 530 may include each feature information. In an example, the first disaster prone area 520 may be a river or stream adjacent to the area at which the flood occurred, and the feature information of the first disaster prone area 520 may be derived based on labeling. Here, the feature information of the first disaster prone area 520 may be information generated in relation to the flood as the disaster affected area 510. That is, the feature information may be derived considering the relevance of the flood to the river or stream. Additionally, the second disaster prone area 520 may be an adjacent road, and the feature information of the second disaster prone area 520 may be generated as information considering the relevance to the flood. Based on the foregoing description, not only the feature information of the disaster affected area 510 but also the feature information of the disaster prone areas 520, 530 may be reflected on the training data.

In an example, at least one of shape, area or direction information of the river or stream as the feature information of the first disaster prone area 520 which is the river or stream may be included as the training data. That is, the information related to the first disaster prone area 520 may be included as the training data. Additionally, elevation comparison information and geographical shape comparison information between the second disaster prone area 530 and the disaster affected area 510, pavement information and any other information as the feature information of the second disaster prone area 530 which is the road near the river or stream may be included as the training data. That is, the training data may include the information associated with the disaster affected area 510 and the derived feature information having the relevance to the disaster affected area 510 as the information associated with the disaster prone areas 520, 530 adjacent to the disaster affected area 510.

In a more specific example, referring to FIG. 5C, in addition to the first disaster prone area 520 and the second disaster prone area 530, third disaster prone area 540, fourth disaster prone area 550 and fifth disaster prone area 560 information may be used as the training data. Here, the third disaster prone area 540 may be a building adjacent to the disaster affected area 510, and information related to the building and flood damage may be added as feature information of the third disaster prone area 540. In an example, the feature information of the third disaster prone area 540 may be building damage information at the time of the flood affected area 510. In contrast, the fourth disaster prone area 550 may be an agricultural land, and information related to the agricultural land and the flood may be included as feature information. In an example, the feature information may include at least one of the shape of the agricultural land, the crop type in the agricultural land, geographical elevation or comparison information with the disaster affected area.

Additionally, the fifth disaster prone area 560 may include feature information having the relevance to the disaster affected area 510 which is a greenhouse. That is, the training data may further include information related to each of the disaster prone areas 510, 520, 530, 540, 550, and training may be performed based on the same.

In another example, the training data may further include affected area related information. In an example, referring to FIG. 6, the feature information of the disaster affected area 610 and the disaster prone area 620 may be derived and reflected on the training data as described above. In an example, in FIG. 6, the disaster affected area 610 may be a flood affected area. In this instance, disaster related information may be additionally reflected on a disaster related learning model as the affected area related information. In an example, for the disaster related information, water flow information 630 and soil flow information 640 may be derived and reflected. In an example, the water flow information 630 and the soil flow information 640 is information having the relevance to the affected area 610 and the flood that caused the disaster, and may be measured at a location or a plurality of locations at a preset distance from the affected area 610, and these information may be reflected on the training data. That is, not only the affected area information and the disaster prone area feature information but also the disaster related information may be reflected as the training data, and training may be performed based on the same.

FIG. 6 illustrates the flood affected area, but is not limited thereto. That is, in addition to the information related to the disaster affected area and the disaster prone area, the training data may further include the related information associated with the disaster, and is not limited to the above-described embodiment.

In another example, the disaster related information may include damage propagation information. Here, the damage propagation information may be a value that is pre-determined depending on the disaster affected area or the disaster prone area. In a specific example, in case that the disaster prone area adjacent to the disaster affected area is a sea wall or a forest area, the probability of damage propagation is low, so the damage propagation value may be set to a low value. In contrast, in the case of a greenhouse, a power plant, a reservoir or a raw land, a disaster may cause significant damage when it occurs, so the damage propagation value of the corresponding areas may be set to a large value. That is, the damage propagation information may be pre-determined based on the features of each of the disaster affected area or the disaster prone area, and the corresponding information may be reflected on the training data as the disaster related information.

In another example, as described above, when the learning model is trained with the information derived as the training data, weights may be assigned to each information. In an example, the weights may be assigned based on the influence on damage as the information related to the damage. In a specific example, the weights may be assigned to the slope in geography, the shape of the river or stream and the depth of water in the river or stream, in order to identify and compare the slope, the shape of the river or stream and the depth of water in the river or stream with priority among the input data, thereby increasing accuracy of damage determination. Based on the foregoing description, the disaster identification learning model may be trained based on at least one of the disaster image, the feature information of the disaster affected area and the disaster prone area acquired through labeling or the disaster related information.

Subsequently, when a disaster actually occurs, disaster images may be acquired based on FIGS. 3A to 3C as described above, the disaster identification learning model may calculate disaster affected area identification information and disaster damage type determination information as the output information to the input of the acquired disaster images.

In this instance, in an example, landmark information may be extracted from the disaster image used as the input information of the disaster identification learning model. Here, the landmark information may be information associated with the neighborhood features adjacent to the disaster affected area as described above. In a more specific example, referring to FIGS. 5A to 5C, at least one information of the shape and area of the river or stream, the direction of the river or stream, the shape/geographical elevation of the agricultural land on the left side of the flood affected area, the purpose of use (a paddy field, a dry filed, or an apple farm, etc.) of the flood affected area or the purpose of use (a paddy field, a dry filed, a greenhouse, etc.) of areas adjacent to the flood prone area may be extracted. Here, in an example, the extraction of the landmark information as described above may be performed based on the above-described information derivation learning model as another learning model.

That is, when the server acquires the disaster images that need to be analyzed, the server may extract the disaster affected area, the disaster prone area and the disaster related information as described above by applying the learning model for extracting the landmark information to the disaster images. Subsequently, the server may use the disaster images and the information extracted based on the foregoing description as the input information of the disaster identification learning model, and calculate the disaster affected area identification information and the disaster damage type determination information as the output information through the disaster identification learning model, thereby increasing the learning accuracy.

In another example, for the advanced learning to identify the disaster affected area, pre-disaster images may be acquired in relation to the disaster images. In an example, the server may acquire the pre-disaster images from another database or another device. In another example, the server may further acquire map images and images in any other formats in relation to the disaster images and use the images as the input information of the above-described disaster identification learning model, thereby increasing accuracy.

In another example, the server may identify the disaster affected area and the type of disaster damage based on the above-described disaster affected area identification information and disaster damage type determination information. More specifically, the server may determine the area of the disaster affected area and the type of the disaster affected area based on the above-described information. Additionally, the server may identify the use of the disaster affected area, and derive the feature information of the disaster affected area. In an example, the use of the disaster affected area may be identified through the above-described disaster images or external data. In an example, the use of the disaster affected area may be classified into raw land, paddy field, dry field, mountain, residential land and farmland. In another example, the use of the disaster affected area may be classified based on more detailed use. In an example, when the use of the disaster affected area is a dry field, the use of the disaster affected area may be determined considering crop information (for example, chili pepper, apple, ginseng, etc.) grown in the ground of the affected area. In another example, the use of the affected area may be determined even considering additional related information as to whether the dry field of the affected area is a farm field in a greenhouse or an open field. In another example, when the affected area is a warehouse, the use of the affected area may be determined even considering products included in the warehouse. In another example, when the affected area is a livestock shelter, the use of the affected area may be determined even considering livestock in the livestock shelter. In this instance, in an example, in addition to the above-described disaster images, the use of the affected area may be determined considering other images of the affected area or its related data. Additionally, in an example, the use of the affected area may be determined based on land register or any other data, and is not limited to the above-described embodiment.

Through the foregoing description, the server may identify the area, type and use of the affected area. Here, when the area, type and use information of the affected area is determined, the server may derive the feature information of the affected area, and identify damage size and compensation level information based on the same. In the present disclosure, the size of damage and the compensation level may be understood as damage costs or compensation amounts. In an example, the server may derive the feature information of the affected area through the aerial image as the disaster image of the affected area. In this instance, the server may derive the feature information based on the features identified in the aerial image considering the area, type and use of the affected area. In a specific example, when the damage in the affected area can be identified in the aerial image, the server may derive the feature information by identifying the area, type and use of the affected area based on the identified damage. Subsequently, the server may identify the damage size information based on the derived feature information.

In another example, in case that the damage type is flooding and the affected area is a greenhouse, it may be impossible to identify damage through the aerial image when there is no damage to the greenhouse. In this instance, in addition to the aerial image, the server may derive the feature information using the affected area related information. In an example, the server may derive greenhouse appearance information from the aerial image. However, it may be impossible to identify damage from the appearance the greenhouse in the aerial image, which makes it difficult to derive the feature information, and thus the feature information may be derived using additional related images or external data, and through this, the damage size information may be identified.

In another example, it may be impossible to identify damage in the affected area on the aerial image in case that the affected area is a ginseng farm. In this instance, damage may not be visually identified in the aerial image due to the presence of the shade roof of the ginseng farm. Here, in an example, the server may identify damage in the aerial image further using the above-described disaster prone area feature information, and derive the feature information. In a more specific example, the shade cloth of the ginseng farm exists, but the disaster prone area may be completely flooded. In this instance, damage in the affected area may not be identified in the aerial image, but the disaster prone area feature information may be derived. Here, the server may determine that an area including the affected area is completely flooded based on the disaster prone area feature information, and derive the feature information based on the same. That is, the server may derive the feature information of the affected area using the information acquired from not only the affected area but also the disaster prone area, and identify the damage size information based on the same.

In another example, in the case of facility (for example, a ginseng farm) having the shade cloth installed in a direction, the server may request an imaging device to capture an image of the inside of the ginseng farm through the opening of the shade cloth. In this case, the drone may capture the image of the inside of the ginseng farm by adjusting the flight position and the image capture angle. Since the angle of the shade cloth is fixed, the position for capturing the image of the inside of the corresponding ginseng farm may be calculated depending on the altitude of the drone, and thus the server may provide the drone with the image capture position and angle of the drone through this calculation.

In another example, the server may further use the external data as additional related information. In an example, it may be determined that the disaster prone area is completely flooded based on the foregoing description, but the probability that it is determined to be completely flooded may be reduced when the ginseng farm has higher altitude than the surrounding area or a drainage system further using cadastral information. That is, the server may derive the feature information of the affected area further using the external data, and identify the damage size information based on the same.

In another example, the server may derive the feature information of the affected area using additional information that may be acquired through the aerial image. In an example, in the case of a ginseng farm, information about the extent of deformation of the pattern of the shade support may be identified in the aerial image. The server may identify the extent of flooding based on the extent of deformation of the pattern of the shade support, and through this, derive the feature information of the affected area, and identify the damage size information. That is, the server may further derive the additional information from the aerial image, derive the feature information using the same, and then identify the damage size information. Additionally, the server may receive the external data and further use the same to derive the damage size information as described above.

In this instance, in a specific example, when there is a crop in the affected area, the server may further acquire, as the external data, at least one of date information at which damage occurred, time information at which the aerial image was captured, area information of the affected area, information as to whether it is possible or impossible harvest and sell the crop in the affected area, crop price information of the affected area, production cost information of the damaged crop or information of the damaged crop, and derive the feature information based on the same and identify the damage size information. In an example, the date information at which damage occurred and the time information at which the aerial image was captured may be information necessary to identify whether the crop in the affected area is ready for harvest or is being harvested. Additionally, in an example, the price information or production cost information of the damaged crop may be acquired from another database (for example, an agricultural cooperative server) or any other devices. Additionally, information about vulnerability to temperature, wind and rainfall as the information of the damaged crop may be considered. Additionally, the damage size information may be derived reflecting information as to whether the damaged crop is annuals or perennials.

In a more specific example, in the case of a ginseng farm, the server may acquire images captured by the drone moving to the opening of the shade cloth in light of the fact that the shade cloth is formed at an angle. Here, the server may identify color information of the ginseng as the crop information in the images, and identify the age of the ginseng by comparing it with database information. The server may derive the feature information of the affected area further reflecting the above-described information, and through this, identify the damage size information.

Based on the foregoing description, the server may derive the feature information considering the area, type and use of the affected area, and through this, identify the damage size information. Here, in an example, the server may further derive the compensation level information. In this instance, the compensation level information may be determined to be equal to the damage size information. In another example, the compensation level information may be determined by reflecting manager liability information on the damage size information. In this instance, the liability information may be determined based on images captured in a normal situation or images captured before the disaster occurred. In another example, the liability information may be determined based on disaster prevention and preparedness information of the disaster affected area. In an example, the disaster prevention and preparedness information may be information stored in a database, and may be compared based on each check list information.

In a specific example, when the damaged roof has been left unrepaired for a long time or the damaged bank has been left unrepaired for a long time, the liability information may be derived considering the above-described situation. In this instance, minus weights may be reflected on the liability information, and final compensation level information may be derived by reflecting it on the damage size information. In another example, when repair is conducted before the disaster or a new device is installed before the disaster, plus weights may be reflected as the liability information, and the final compensation level information may be derived reflecting it on the damage size information. That is, when the liability information is identified, the plus or minus weights may be reflected, and based on this, the compensation level information may be set as being larger or smaller than an average value of the damage size information, and is not limited to the above-described embodiment.

In a specific example in which the server derives the feature information in the affected area and identifies the size of damage, referring to FIGS. 7A and 7B, the server may identify the area, type and use of the disaster affected area based on the disaster affected area identification information and the disaster damage type determination information as described above. In an example, in FIGS. 7A and 7B, the disaster affected areas 711, 721 may be derived using the aerial image of locations 710, 720 affected by the disaster. Here, the server may identify the affected areas through the aerial image, derive the feature information, and identify the damage size information. In an example, when the disaster affected areas 711, 721 are identified based on the aerial image, the feature information is derived based on the damage information identified in the aerial image and the damage size information is identified, the server may only identify the damage size information using the aerial image.

In another example, in addition to the aerial image, the server may derive the feature information further considering the external data and the related image, and identify the size of damage. In an example, in FIGS. 7A and 7B, the server may use the image of the disaster affected areas captured at a different angle as the related image. Here, the related image may be a close-up image, and corresponding affected areas 712, 722 may be derived from the aerial image and compared with the affected areas 711, 721 of the aerial image. Additionally, in an example, the server may use a pre-disaster image. In this instance, the server may derive areas 713, 723 corresponding to the affected areas from the pre-disaster image, derive the feature information by comparing them with the affected areas 711, 721 of the aerial image, and identify the damage size information.

In another example, referring to FIGS. 8A to 8C, the server may use an image captured considering the use of the disaster affected area as the related image. Here, the related image may be an image of an object (for example, crop) to which direct damage occurred in affected areas 811, 821, 831, and through this, may derive the feature information and identify the damage size information. That is, the server may identify the affected areas 811, 821, 831 based on the aerial image at locations 810, 820, 830 at which disaster damage occurred, derive the feature information further reflecting the image of the object in the real affected areas as the related image, and identify the damage size information.

In another example, referring to FIGS. 9A to 9C, the server may derive the size of damage further using the external data. Here, the external data may be information on a cadastral map. Additionally, the external data may be information associated with affected areas at which similar disasters occurred. In a specific example, in FIG. 9A, information associated with an area in which the same type of disaster damage occurred may be further identified, the feature information may be derived using the same, and then the damage size information may be identified.

In another example, referring to FIGS. 9B and 9C, the server may derive the feature information using information associated with a disaster affected area and a non-affected area. In an example, facility A 911, 921 is the disaster affected area, and facility B 912, 922 may be the non-affected area. In an example, the server may identify the affected area and the damage type in facility A 911, 921 as described above. Additionally, the server may derive the feature information using related image information of facility A 911, 921, and identify the damage size information. In this instance, in an example, the server may further use image information of facility B 912, 922 as the non-affected area. Here, the server may derive an area corresponding to the affected area and related information from the non-affected area, derive the feature information by comparing it with the affected area, and identify the damage size information, and is not limited to the above-described embodiment.

In another example, when the server reflects the external data on the disaster identification learning model, the server may assign weights. Here, the weighted external data may be applied to the learning model and used in the process of deriving the output, and is not limited to the above-described embodiment. In an example, the external data may be information acquired by the server from the network or the external device, and is not limited to a particular type.

However, in an example, the external data may be information related to the disaster images. In a more specific example, the server may acquire the external data from a disaster statistical database. That is, the external data may be information acquired from the database including disaster related statistical information, and may be reflected on the learning model. In an example, the server may identify the disaster type based on the above-described disaster images. Here, the disaster type may be classified based on the disaster type defined in the disaster statistical database. That is, the disaster type may be determined based on the disaster statistical database information. Subsequently, the server may acquire information associated with a specified disaster type as the external data. In an example, the external data may include at least one of damage size information, damage frequency information, damage cost information, human loss information, damage cause information or fault related information based on the specified disaster type. Additionally, the external data may further include any other disaster related information, and is not limited to particular information.

FIG. 10A is a diagram showing a method for building the learning model based on the disaster images in an embodiment of the present disclosure.

Referring to FIG. 10A, the server may train the disaster identification learning model through the plurality of existing disaster images. Here, the server may acquire the plurality of existing disaster images (S1011). In this instance, the disaster affected area and the disaster prone area may be derived from the plurality of existing disaster images. In an example, the server may derive the disaster affected area and the disaster prone area from the disaster images through the information derivation learning model as described above (S1012). Subsequently, the feature information of each of the derived disaster affected area and disaster prone area may be derived through labeling (S1013). Here, labeling and feature information derivation may be performed based on the above-described information derivation learning model, and is not limited to the above-described embodiment. In an example, as described above, in the case of the existing disaster images, the damage related information caused by the disaster may be preset, labeling may be performed in relation to the disaster affected area and the disaster prone area based on the corresponding information, and the feature information may be derived. Here, the feature information derived based on labeling may include at least one of the affected area information, the damage type information, the neighborhood feature information, the damage propagation information, the weather information at the time of the disaster or date information based on each disaster image as shown in FIG. 4. In this instance, the feature information may be used to train the disaster identification learning model together with the disaster images. Subsequently, the weights may be applied to the labeling information and the disaster affected area/disaster prone area information described above (S1014). In this instance, in an example, the weights may be differently set for each information. In another example, the weights may be set reflecting the above-described damage propagation information, and are not limited to the above-described embodiment. Subsequently, the server may train the disaster identification learning model using each disaster image, the labeling information and the disaster affected area/disaster prone area information, and through this, may update the disaster identification learning model (S1015).

Additionally, referring to FIG. 10B, the server may analyze the real disaster images using the updated disaster identification learning model, and based on this, derive the disaster affected area identification information and the disaster damage type information. More specifically, the server may acquire the disaster images as aerial images based on FIGS. 3A to 3C (S1021). In this instance, the disaster affected area and the disaster prone area may be derived from each disaster image. In an example, the server may derive the disaster affected area and the disaster prone area based on the information derivation learning model as the landmark information, and acquire the feature information through labeling (S1023). Subsequently, the weights may be applied to each extracted information (S1024), and the weighted information may be used as the input information of the updated disaster identification learning model. Additionally, in an example, in addition to the disaster images, the server may further acquire at least one of pre-disaster images, neighborhood images, map images, geographical images or any other related images (S1025). In this instance, as described above, the server may apply the weighted information, the disaster images and any other related images as the input to the disaster identification learning model (S1026). The disaster identification learning model may identify the disaster affected area based on the trained database based on the above-described input information, and derive the related information (S1027). Subsequently, the disaster identification learning model may provide the disaster affected area identification information and the disaster damage type information as the output information, thereby increasing accuracy in identifying the affected areas in the disaster images.

FIG. 11A is a diagram showing a method for determining the size of disaster damage and the compensation level based on the disaster affected area in an embodiment of the present disclosure.

Referring to FIG. 11A, the server may identify the affected area and the damage type based on FIGS. 10A and 10B (S1111). Subsequently, the server may identify the use of the affected area (S1112). In this instance, the use of the affected area may be determined based on usage information of the affected area. In an example, the usage information may be classified into raw land, paddy field, dry field, mountain, residential land and farmland according to what the affected area is used for.

In another example, the use of the disaster affected area may be determined through the detailed use information considering what the affected area is used for. In an example, when the use of the disaster affected area is a dry field, the use of the affected area may be determined considering crop information (for example, chili pepper, apple, ginseng, etc.) grown in the ground of the affected area. In another example, the use of the affected area may be determined even considering additional related information as to whether the dry field of the affected area is a farm field in a greenhouse or an open field. In another example, when the affected area is a warehouse, the use of the affected area may be determined even considering products included in the warehouse. In another example, when the affected area is a livestock shelter, the use of the affected area may be determined even considering livestock in the livestock shelter. As described above, after the use of the affected area is identified, the server may derive the feature information of the affected area (S1113). Here, the feature information may be information associated with the object at which damage actually occurred considering the area, type and use of the affected area. In an example, the feature information of the affected area may be identified based on the above-described aerial images, and may be only derived using the aerial images.

In another example, even though the area and type of the affected area is identified by the aerial images, there may be limitations on identifying the feature information of the affected area and identifying the damage size information only through the aerial images. In view of the foregoing description, the server may further consider the related images related to the affected area (S1114). Additionally, the server may further consider the external data related to the affected area (S1115). In an example, the related images related to the affected area may be close-up images, pre-disaster images, non-affected area images and any other related images. Additionally, in an example, the external data may include at least one of a topographical map, a cadastral map, date information at which damage occurred, time information at which the aerial image was captured, area information of the affected area, information as to whether it is possible or impossible to harvest and sell the crop in the affected area, crop price information of the affected area, production cost information of the damaged crop, information of the damaged crop or any other related information related to the affected area. That is, in addition to the aerial images, the server may derive the feature information further using the related images and the external data information, and identify the damage size information. Here, the server may apply the weights to each image and the external data (S1116). In an example, each of the weights may be differently applied depending on the feature information extracted from the images and the type of the external data. Subsequently, the server may identify the damage size information and the compensation level information using the weighted information, and is not limited to the above-described embodiment.

In another example, FIG. 11B is a diagram showing a method for determining the size of disaster damage and the compensation level based on the disaster affected area in an embodiment of the present disclosure. Referring to FIG. 11B, the server may identify the affected area and the damage type based on FIGS. 10A and 10B (S1121). Subsequently, the server may identify the use of the affected area (S1122). In this instance, the use of the affected area may be determined based on usage information of the affected area. In an example, the usage information may be classified into raw land, paddy field, dry field, mountain, residential land and farmland according to what the affected area is used for.

In another example, the use of the disaster affected area may be determined considering the detailed use considering what the affected area is used for. In an example, when the use of the disaster affected area is a dry field, the use of the affected area may be determined considering crop information (for example, chili pepper, apple, ginseng, etc.) grown in the ground of the affected area. In another example, the use of the affected area may be determined even considering additional related information as to whether the dry field of the affected area is a farm field in a greenhouse or an open field. In another example, when the affected area is a warehouse, the use of the affected area may be determined even considering products included in the warehouse. In another example, when the affected area is a livestock shelter, the use of the affected area may be determined even considering livestock in the livestock shelter. As described above, the use of the affected area is identified, the server may derive the feature information of the affected area (S1123). Here, the feature information may be information associated with the object at which damage actually occurred considering the area, type and use of the affected area. In an example, the feature information of the affected area may be identified based on the above-described aerial images and derived through this.

In another example, even though the area and type of the affected area is identified by the aerial images, there may be limitations on identifying the feature information of the affected area and deriving the damage size information only through the aerial image. In view of the foregoing description, the server may use a damage size estimation learning model. Here, since it may not be easy to calculate the weights applied to estimate the size of damage, the learning model may be used. In an example, the input of the damage size estimation learning model may include at least one of the affected area feature information, the related images or the external data derived based on the foregoing description. In this instance, the related images related to the affected area may be close-up images, pre-disaster images, non-affected area images and any other related images. Additionally, in an example, the external data may include at least one of a topographical map, a cadastral map, date information at which damage occurred, time information at which the aerial image was captured, area information of the affected area, information as to whether it is possible or impossible to harvest and sell the crop in the affected area, crop price information of the affected area, production cost information of the damaged crop, information of the damaged crop or any other related information related to the affected area.

In this instance, the damage size estimation learning model may derive the damage size information and the compensation level information as an output value based on the above-described input information (S1127). In this instance, the derived output value may be fed back to the learning model, and through this, the learning model may be updated. It is possible to increase accuracy in deriving the damage size information and the compensation level information by updating the damage size estimation learning model through the foregoing description.

FIG. 12 is a flowchart showing a method for identifying the disaster affected area in an embodiment of the present disclosure.

Referring to FIG. 12, there may be provided the operation method of the server for identifying the disaster affected area. In this instance, the server may acquire at least one first disaster image (S1210). In an example, the first disaster image may be an existing disaster image, and the server may acquire a plurality of existing disaster images. Subsequently, the server may derive an affected area from each of the at least one first disaster image, and acquire affected area related information through labeling based on the derived affected area (S1220). Subsequently, the server may train a first learning model using the at least one first disaster image and the affected area related information (S1230). In this instance, the first learning model may be the above-described disaster identification learning model. That is, the server may train the disaster identification learning model using the plurality of existing disaster images.

In this instance, the server may derive a plurality of disaster prone areas based on the affected area derived from each of the at least one first disaster image. That is, not only the disaster affected area but also the plurality of disaster prone areas may be derived, and disaster prone area related information may be acquired for each of the plurality of derived disaster prone areas based on labeling. Here, the first learning model may be trained further using the disaster prone area related information for each of the plurality of derived disaster prone areas. In this instance, in an example, the disaster prone area related information for each of the plurality of derived disaster prone areas may include the feature information for each of the plurality of disaster prone areas as described above. In this instance, the feature information may be information set considering the relevance of each of the plurality of disaster prone areas to the disaster affected area as described above. Additionally, the server may acquire a second disaster image from an external device. In this instance, the external device may be any one of the drone, the satellite and the airplane described in FIGS. 3A to 3C. Additionally, the external device may be another device or a database, and is not limited to the above-described embodiment. Additionally, the second image may be a real disaster image that needs to be analyzed.

In this instance, the server may derive a disaster affected area and a disaster prone area from the second disaster image, acquire a plurality of disaster related information through labeling based on the derived disaster affected area and disaster prone area, and assign the weights to each of the plurality of acquired disaster related information. Subsequently, the server may provide the second disaster image and the plurality of disaster related information to the trained first learning model as the input, and output disaster affected area identification information and disaster damage type information based on the first learning model to identify the final affected area.

Additionally, in an example, the server may acquire at least one related image related to the second disaster image, and the acquired image may be inputted to the first learning model together with the second disaster image and the plurality of disaster related information. In this instance, in an example, the at least one related image may include at least one of the pre-disaster image, the neighborhood image, the map image or the geographical image as described above. Additionally, in an example, the second disaster image may be inputted to a second learning model, and the second learning model may derive the disaster affected area and the disaster prone area of the second disaster image, and provide a plurality of disaster related information as the output information through labeling based on the derived disaster affected area and disaster prone area. Here, the second learning model may be the above-described information derivation learning model. That is, each of the disaster affected area and the disaster prone area may be derived as the landmark information based on the information derivation learning model.

Additionally, in an example, the server may receive damage propagation information for each of the derived disaster affected area and disaster prone area, and determine the weights for each of the plurality of acquired disaster related information further reflecting the damage propagation information. Here, the damage propagation information may be numericalized information considering the disaster occurrence probability as described above.

Additionally, in an example, the server may acquire disaster affected area use information, and identify the area, type and use of the disaster affected area based on the disaster affected area identification information, the disaster damage type information and the disaster affected area use information as described above. In this instance, the server may derive disaster affected area feature information based on the identified area of the disaster affected area, the identified type of the disaster affected area and the identified use of the disaster affected area, and identify damage size information based on the derived disaster affected area feature information. In this instance, in an example, the server may further acquire at least one third disaster image related to the disaster affected area and at least one external data related to the disaster affected area.

In this instance, the third disaster image is the related image and may be a close-up image, a pre-disaster image, a non-affected area image and any other related images. Additionally, in an example, the external data may include at least one of a topographical map, a cadastral map, date information at which damage occurred, time information at which the aerial image was captured, area information of the affected area, information as to whether it is possible or impossible to harvest and sell the crop in the affected area, crop price information of the affected area, production cost information of the damaged crop, information of the damaged crop or any other related information related to the affected area. In this instance, the server may identify the damage size information further reflecting the at least one third disaster image and the at least one external data as described above. Additionally, the server may assign the weight to each of the disaster affected area feature information, the at least one third disaster image and the at least one external data, and identify the damage size information reflecting the assigned weights. In another example, the server may provide the disaster affected area feature information, the at least one third disaster image and the at least one external data as input data of a third learning model, and acquire the damage size information as output data through the third learning model. In this instance, the damage size information may be provided to the third learning model as feedback information, and the third learning model may be updated based on the damage size information. Here, the third learning model may be the above-described damage size estimation learning model, and is not limited to the above-described embodiment.

The embodiments described above may be, at least in part, incorporated into a computer program and recorded in a computer-readable recording medium. The computer-readable recording medium includes any type of recording device that records the program for realizing the embodiments and stores computer-readable data. Examples of the computer-readable recording medium include ROM, RAM, CD-ROM, magnetic tape, optical data storage devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and it will be appreciated by those having ordinary skill in the art that various modifications and variations may be made thereto. However, it should be noted that such modifications fall in the technical protection scope of the present disclosure. Therefore, the true technical protection scope of the present disclosure should be defined as including other embodiments, other examples and the equivalents to the appended claims by the technical spirit of the appended claims.

The invention claimed is:

1. An operation method of a server for estimating a size of damage in disaster affected areas, the operation method comprising:
    acquiring at least one first disaster image;
    deriving a disaster affected area from each of the at least one first disaster image, and acquiring affected area related information through labeling based on the derived disaster affected area;
    training a first learning model using the at least one first disaster image and the affected area related information;
    estimating damage size information of the disaster affected area in the first disaster image based on the first learning model;
    acquiring a second disaster image from an external device;
    deriving a disaster affected area and a disaster prone area from the second disaster image;
    acquiring a plurality of disaster related information through labeling based on the derived disaster affected area and the derived disaster prone area;
    assigning a weight to each of the plurality of acquired disaster related information;
    inputting the second disaster image and the plurality of disaster related information to the trained first learning model;
    outputting disaster affected area identification information and disaster damage type information based on the first learning model;
    acquiring disaster affected area use information;
    identifying an area of the disaster affected area, a type of the disaster affected area and a use of the disaster affected area based on the disaster affected area identification information, the disaster damage type information and the disaster affected area use information;
    deriving disaster affected area feature information based on the identified area of the disaster affected area, the identified type of the disaster affected area and the identified use of the disaster affected area; and
    identifying the damage size information based on the derived disaster affected area feature information.

2. The operation method according to claim 1, wherein the second disaster image is inputted to a second learning model, and
    wherein the second learning model derives the disaster affected area and the disaster prone area of the second disaster image, and provides the plurality of disaster related information as output information through the labeling based on the derived disaster affected area and the derived disaster prone area.

3. The operation method according to claim 1, further comprising:
    acquiring at least one third disaster image related to the disaster affected area and at least one external data related to the disaster affected area,
    wherein the damage size information is identified further reflecting the at least one third disaster image and the at least one external data.

4. The operation method according to claim 3, wherein the weight is assigned to each of the disaster affected area feature information, the at least one third disaster image and the at least one external data, and
    wherein the damage size information is identified reflecting the assigned weights.

5. The operation method according to claim 3, wherein the disaster affected area feature information, the at least one third disaster image and the at least one external data is provided as input data of a third learning model, and
wherein the third learning model derives the damage size information as output data based on the input data.

6. The operation method according to claim 5, wherein the damage size information is provided to the third learning model as feedback information, and
wherein the third learning model is updated based on the damage size information.

7. The operation method according to claim 5, wherein when the external data is provided as the input data of the third learning model, the external data is assigned the weight and provided as the input data of the third learning model, and
wherein the server acquires the external data from a disaster statistical database.

8. The operation method according to claim 7, wherein the server acquires the external data from the disaster statistical database, the server identifies a damage type based on the at least one first disaster image, extracts at least one information corresponding to the disaster type from the disaster statistical database and acquires the at least one information as the external data, and
wherein the at least one information includes at least one of damage size information, damage frequency information, damage cost information, human loss information, damage cause information, or fault related information.

9. A computer program stored in a non-transitory computer-readable medium to perform the operation method according to claim 1 in combination with hardware.

10. A server for estimating a size of damage in disaster affected areas, the server comprising:
a transmitter/receiver which communicates with an external device; and
a processor to control the transmitter/receiver,
wherein the processor is configured to:
acquire at least one first disaster image,
derive a disaster affected area from each of the at least one first disaster image, and acquire affected area related information through labeling based on the derived disaster affected area,
train a first learning model using the at least one first disaster image and the affected area related information,
estimate damage size information of the disaster affected area in the first disaster image based on the first learning model,
acquire a second disaster image from the external device,
derive a disaster affected area and a disaster prone area from the second disaster image,
acquire a plurality of disaster related information through labeling based on the derived disaster affected area and the derived disaster prone area,
assign a weight to each of the plurality of acquired disaster related information,
input the second disaster image and the plurality of disaster related information to the trained first learning model,
output disaster affected area identification information and disaster damage type information based on the first learning model,
acquire disaster affected area use information,
identify an area of the disaster affected area, a type of the disaster affected area and a use of the disaster affected area based on the disaster affected area identification information, the disaster damage type information and the disaster affected area use information,
derive disaster affected area feature information based on the identified area of the disaster affected area, the identified type of the disaster affected area and the identified use of the disaster affected area, and
identify the damage size information based on the derived disaster affected area feature information.

11. The server according to claim 10, wherein the second disaster image is inputted to a second learning model, and
wherein the second learning model derives the disaster affected area and the disaster prone area of the second disaster image, and provides the plurality of disaster related information as output information through the labeling based on the derived disaster affected area and the derived disaster prone area.

12. The server according to claim 10, wherein the processor is further configured to acquire at least one third disaster image related to the disaster affected area and at least one external data related to the disaster affected area,
wherein the damage size information is identified further reflecting the at least one third disaster image and the at least one external data.

13. The server according to claim 12, wherein the weight is assigned to each of the disaster affected area feature information, the at least one third disaster image and the at least one external data, and
wherein the damage size information is identified reflecting the assigned weights.

14. The server according to claim 12, wherein in the disaster affected area feature information, the at least one third disaster image and the at least one external data is provided as input data of a third learning model, and
wherein the third learning model derives the damage size information as output data based on the input data.

15. The server according to claim 14, wherein the damage size information is provided to the third learning model as feedback information, and
wherein the third learning model is updated based on the damage size information.

16. The server according to claim 14, wherein when the external data is provided as the input data of the third learning model, the external data is assigned the weight and provided as the input data of the third learning model, and
wherein the server acquires the external data from a disaster statistical database.

* * * * *